(12) United States Patent
Hinders et al.

(10) Patent No.: US 10,661,628 B2
(45) Date of Patent: May 26, 2020

(54) APPARATUS FOR ATTACHING A STABILIZER BAR TO A VEHICLE

(71) Applicant: Honda Motor Co., Ltd., Tokyo (JP)

(72) Inventors: Dustin L. Hinders, Lakeview, OH (US); Scott R. Harvey, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 130 days.

(21) Appl. No.: 16/010,027

(22) Filed: Jun. 15, 2018

(65) Prior Publication Data

US 2019/0381854 A1  Dec. 19, 2019

(51) Int. Cl.
*B60G 21/055* (2006.01)
*B60R 13/08* (2006.01)

(52) U.S. Cl.
CPC ...... *B60G 21/0551* (2013.01); *B60R 13/0876* (2013.01); *B60G 2204/1222* (2013.01); *B60G 2204/41* (2013.01); *B60G 2300/07* (2013.01)

(58) Field of Classification Search
CPC ........ B60G 21/0551; B60G 2204/1222; B60G 2204/41; B60G 2206/427; B60G 2300/07; B60G 2202/135; B60R 13/0876
See application file for complete search history.

(56) References Cited

U.S. PATENT DOCUMENTS

| 4,085,816 | A  |   | 4/1978  | Amagai et al. |             |
|-----------|----|---|---------|---------------|-------------|
| 4,854,766 | A  | * | 8/1989  | Hein          | B60G 21/0551 |
|           |    |   |         |               | 403/224     |
| 6,179,328 | B1 |   | 1/2001  | Kawagoe et al. |            |
| 6,971,640 | B2 | * | 12/2005 | Joseph        | B60G 21/0551 |
|           |    |   |         |               | 267/141     |
| 7,318,593 | B2 | * | 1/2008  | Sterly        | B60G 21/0551 |
|           |    |   |         |               | 267/189     |
| 7,637,515 | B2 | * | 12/2009 | Parisi        | B60G 21/0551 |
|           |    |   |         |               | 24/284      |
| 8,505,940 | B1 | * | 8/2013  | Hufnagle      | B60G 21/0551 |
|           |    |   |         |               | 280/124.13  |
| 2007/0241526 | A1 | * | 10/2007 | Plante     | B60G 21/0551 |
|           |    |   |         |               | 280/124.107 |
| 2019/0299737 | A1 | * | 10/2019 | Sellars    | B62D 21/183 |

FOREIGN PATENT DOCUMENTS

| CN | 202782640 U   |   | 3/2013 |
|----|---------------|---|--------|
| CN | 207128788 U   |   | 3/2018 |
| JP | 2008049813 A  | * | 3/2008 |
| JP | 5561608 B     |   | 7/2014 |

\* cited by examiner

*Primary Examiner* — Laura Freedman
(74) *Attorney, Agent, or Firm* — Honda Patents & Technologies North America, LLC; Clifford B Vaterlaus

(57) ABSTRACT

An apparatus for connecting a stabilizer bar to a vehicle includes a support for attaching to the vehicle. The support defines a space for receiving a bushing through which the stabilizer bar can extend. The support includes tabs to which a heat shield can be attached. The heat shield is spaced apart from the bushing to define a gap between the heat shield and the bushing to protect the bushing from heat emitted from the vehicle exhaust system or engine.

20 Claims, 14 Drawing Sheets

APPARATUS FOR ATTACHING A STABILIZER BAR TO A VEHICLE

BACKGROUND

The disclosed subject matter relates to vehicle component attachment devices. More particularly, the disclosed subject matter relates to devices for mounting a stabilizer bar to a vehicle.

Vehicles, such as but not limited to all-terrain vehicles, can include a generally long-travel suspension assembly for each wheel that is designed to allow each wheel to move over relative large undulations and/or objects such that each suspension assembly can absorb some or all of the respective wheel displacement without transmitting the wheel displacement to the frame assembly or body assembly of the vehicle during travel over the uneven terrain. However, a long-travel suspension assembly can permit the frame assembly or body assembly of the vehicle to rotate about a longitudinal axis (also referred to as a roll axis) of the vehicle as the vehicle travels along a curved path. This rotation of the vehicle frame or body can be referred to as body roll.

As a countermeasure for reducing body roll while providing a soft or compliant suspension that can absorb an advantageous amount of wheel displacement, a stabilizer bar can be connected to the suspension assemblies on opposites sides at the same end of the vehicle. The stabilizer bar (also referred to as an anti-roll bar, or an anti-sway bar) is a relatively rigid member that is resistant to a torsional input caused by body roll while also being compliant to a torsional input caused by wheel displacement by uneven terrain.

For example, if the left-side suspension assembly moves in a direction that is opposite to the direction in which the right-side suspension assembly moves, then a torsional load is input to the stabilizer bar. The stabilizer bar can be tuned to absorb or resist this torsional input such that the relatively opposite movements of the left-side and right-side suspensions assemblies can be reduced or resisted, thereby reducing or resisting an amount of body roll during cornering.

Further, one or more bearings can be used to mount the stabilizer bar on a rigid portion of the vehicle, such as but not limited to the frame assembly or a rigid portion of the body assembly. The bearings permit the stabilizer bar to rotate within the bearings so that the stabilizer bar does not reduce or resist movement of the left-side and right-side suspension assemblies in the same direction. Portions of the bearings may be formed of a material that may degrade if subjected to excessive heat from the vehicle engine or exhaust system. Accordingly, it would be beneficial to provide a device for attaching a stabilizer bar to the vehicle that protects the bearing from excessive heat, and that is easy to manufacture and install.

SUMMARY

Some embodiments of the present disclosure are directed to an apparatus for connecting a stabilizer bar to a vehicle. The apparatus may include a support having a first portion for attaching to the vehicle on one side of the stabilizer bar, and a second portion for attaching to the vehicle on an opposite side of the stabilizer bar. The support extends in a first direction between the first portion and the second portion and defines a space for receiving a bushing for the stabilizer bar such that the stabilizer bar is configured to extend in a second direction substantially perpendicular to the first direction. A heat shield may be joined to the support and configured for shielding the bushing from heat. The heat shield may extend beyond the support in the second direction.

Further embodiments of the present disclosure are directed to an apparatus for connecting a stabilizer bar to a vehicle. The apparatus includes a support having a first portion for attaching to the vehicle on one side of the stabilizer bar, and a second portion for attaching to the vehicle on an opposite side of the stabilizer bar. The support defines a space for receiving a bushing for the stabilizer bar between the first portion and the second portion. The support further includes at least one tab, and a heat shield joined to the at least one tab of the support. The heat shield is configured for shielding the bushing from heat.

Additional embodiments of the present disclosure are directed to an apparatus for connecting a stabilizer bar to a vehicle. The apparatus includes a support configured for being attached to the vehicle, and a bushing disposed in the support. The bushing has a through hole for receiving the stabilizer bar therethrough. A heat shield may be joined to the support and spaced apart from the bushing to define a gap between the heat shield and the bushing. The heat shield is configured for shielding the bushing from heat.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Various vehicular design factors may make it challenging to package a stabilizer bar into a predetermined space on the vehicle, while also facilitating assembly of the stabilizer bar onto the vehicle. The stabilizer bar needs to span an area of the vehicle that extends between the left-side suspension assembly and the right-side suspension assembly. Further, the stabilizer bar can transmit relatively high loads to any adjacent part(s), and can require a relatively large area or volume for movement. These and other factor(s) can be taken into account in design of the stabilizer bar, while also considering a suitable location on the vehicle where it is possible to provide an advantageous amount of torsional resistance to opposite direction movement of the left-side and right-side suspension assemblies.

It may therefore be beneficial to provide a vehicle and a frame and suspension assembly for the vehicle with an apparatus that addresses at least one of the above and/or other challenges of related art vehicles. In particular, it may be beneficial to mount the stabilizer bar on a portion of the vehicle that is normally exposed or easily exposed in order to facilitate installation, maintenance and replacement of the stabilizer bar. Further, it may be beneficial to locate the stabilizer bar on a portion of the vehicle that does not interfere of otherwise complicate installation of further component(s), assembly(ies), and/or system(s) of the vehicle.

For vehicles that are primarily intended for use on an unimproved path or an unmarked path, it may be beneficial to mount the stabilizer bar on a location of the vehicle such that the stabilizer bar does not reduce or otherwise adversely affect the ground clearance of the vehicle. Further, it may be beneficial to mount the stabilizer bar on a location of the vehicle that reduces or prevent contact of the stabilizer bar with the terrain or other objects as the vehicle travels along the unimproved path or the unmarked path. Further, it may be beneficial to locate a stabilizer bar at a position that either transmits or avoids transmission of torque or force to/through various known components of the vehicle.

Figure 1:
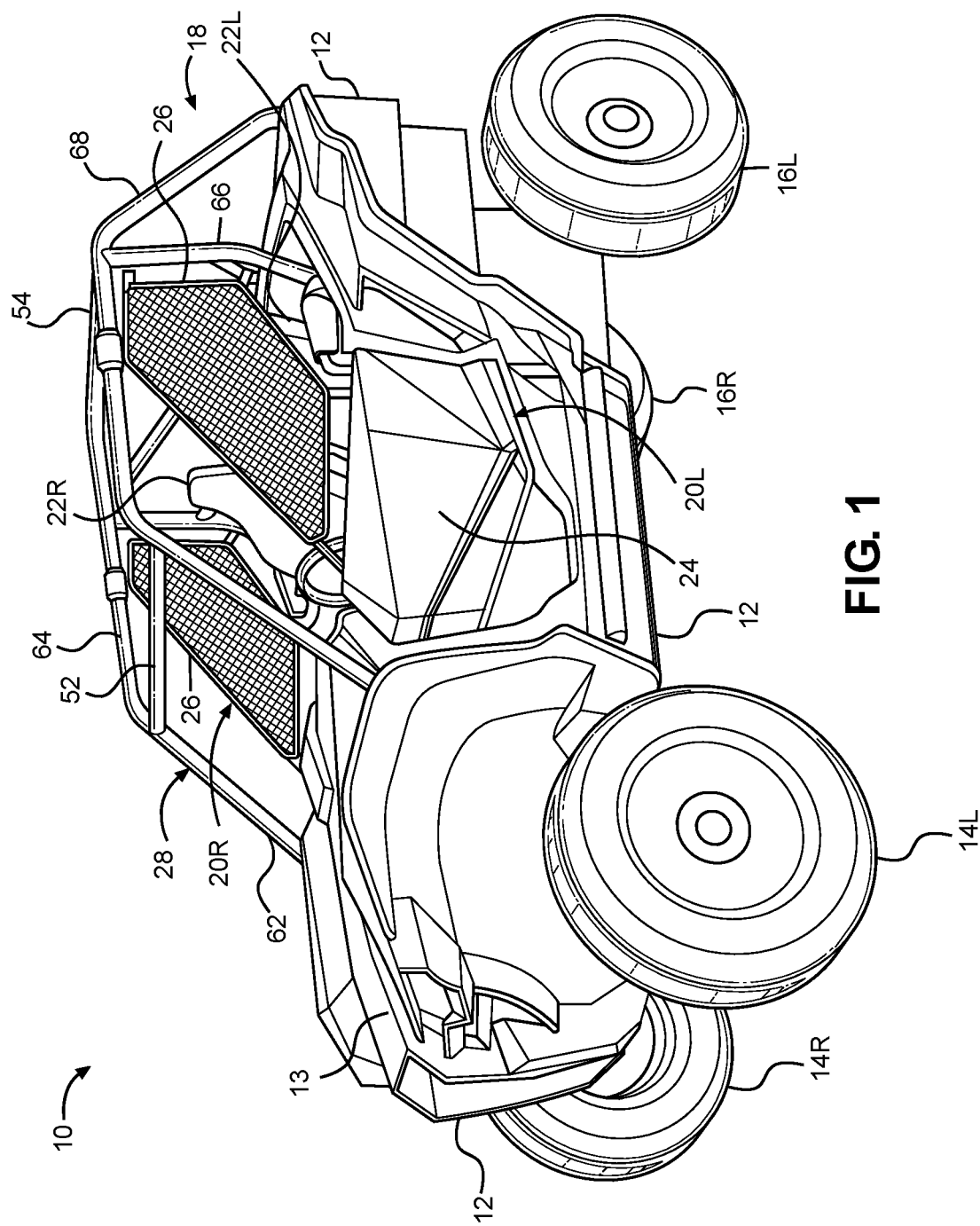
FIG. 1 is a perspective view of a vehicle made in accordance with principles of the disclosed subject matter.

FIG. 1 is a perspective view of an exemplary vehicle 10 including frame assembly 18 in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed vehicle frame assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, work vehicle, etc.

Figure 2:
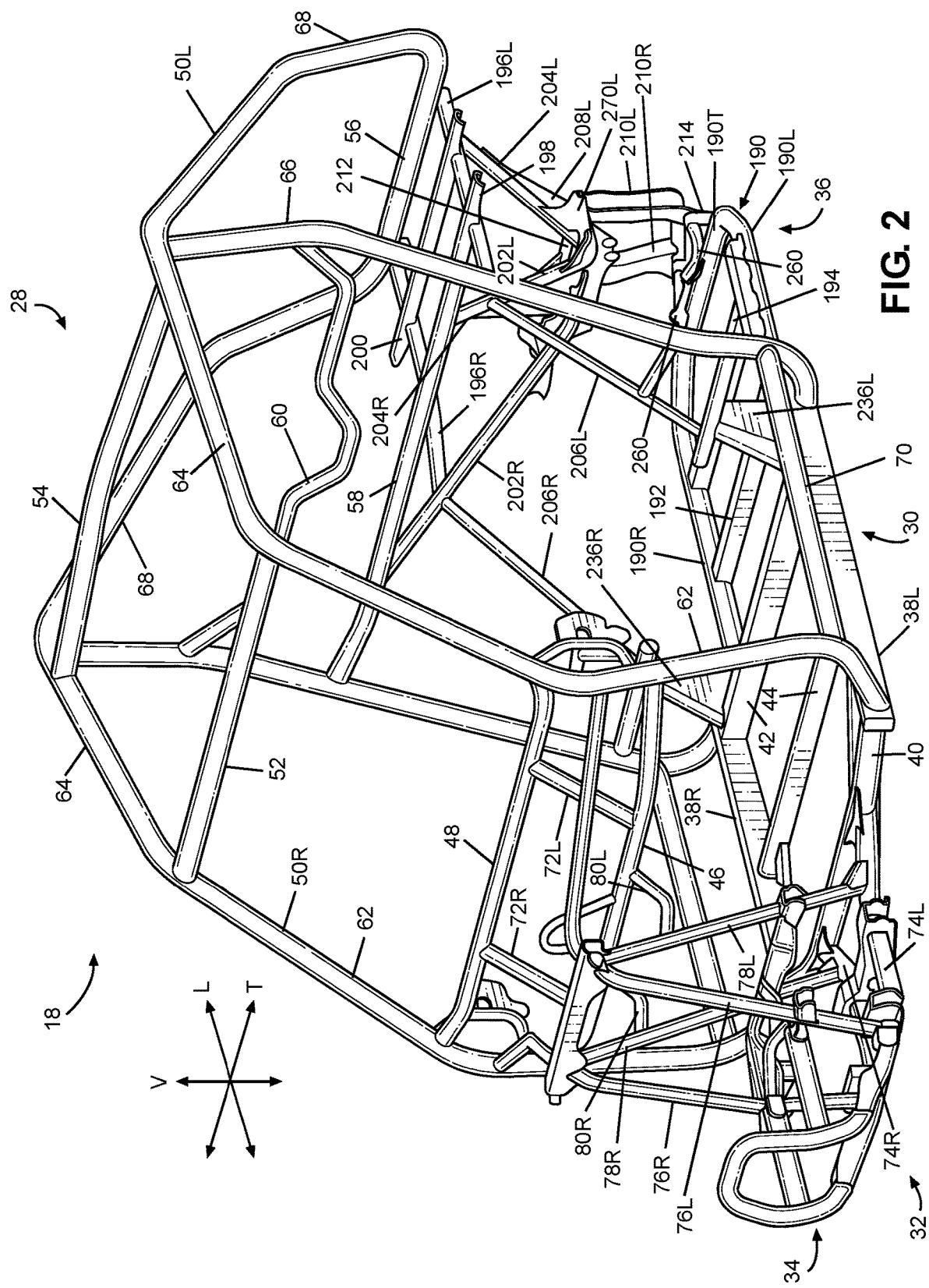
FIG. 2 is perspective upper front view of a frame assembly of the vehicle of FIG. 1.

The vehicle 10 can include a body 12, a pair of front wheels, 14L, 14R, a pair of rear wheels 16L, 16R, a frame assembly 18, a pair of door assemblies 20L, 20R, and a powertrain. Portions of the frame assembly 18 are hidden from view in FIG. 1 by the body 12 (but are shown in FIG. 2), and the powertrain is omitted from FIGS. 1 and 2 for simplicity and clarity of the drawings.

The vehicle 10 can include a pair of front seats 22L, 22R mounted in a passenger area of the vehicle 10. The frame assembly 18 can include a roll cage 28 configured to extend around and above the seats 22L, 22R and the passenger area. The roll cage 28 can cooperate with the body 12 and/or at least a portion of the frame assembly 18 to define a pair of door openings through which a passenger may pass in order to enter or exit the passenger area.

The door assemblies 20L, 20R, which occupy the door openings, each can include a door 24 and a window panel assembly 26, and can be configured to selectively open and close access through the door openings by moving between a closed position and a fully opened position. (The door 24 of the right-side door assembly 20R is obscured from view in FIG. 1). In the closed position, the door assemblies 20L, 20R, can span the respective door openings to obstruct access to the passenger area via the door openings. In the closed position, the front portion of each door assembly 20L, 20R can be latched to the roll cage 28. The fully opened position can be any position where the door assemblies 20L, 20R are pivoted away from the respective door openings to provide substantially unobstructed access to the passenger area via the door openings. FIG. 1 shows the door assemblies 20L, 20R in the closed position.

The powertrain can include an internal combustion engine, one or more electric motor(s) or a hybrid of an internal combustion engine and one or more electric motor(s), a hydrogen engine, or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14 and selectively drive the rear wheels 16L, 16R. In the exemplary embodiment of FIG. 1, the powertrain is configured as a longitudinally oriented, rear-mounted internal combustion engine that drives the rear wheels 16L, 16R and selectively drives the front wheels 14L, 14R.

II. Frame Assembly

FIG. 2 is a perspective view of the frame assembly 18 of the vehicle 10 shown in FIG. 1, with the body 12 and all other components, assembly(ies) and system(s) removed. The frame assembly 18 can be configured to support the body 12, door assemblies 20L, 20R, seats 22L, 22R, suspension components for the wheels 14L, 14R, 16L, 16R, powertrain, steering system, control pedal assemblies, passengers and cargo items. The frame assembly 18 can be configured to withstand various modes of operation, including operation on unimproved paths, and can be configured to surround the passenger area.

The frame assembly 18 can include a main frame assembly 30, a front frame assembly 32, a front bumper assembly 34 and a rear frame assembly 36.

The main frame assembly 30 can define the passenger area of the vehicle 10. The main frame assembly 30 can also provide an overall bending stiffness and torsional stiffness characteristic for the vehicle 10 that can be advantageous for rugged terrain of an unimproved path.

The front frame assembly 32 can be connected to the front end of the main frame assembly 30. The front frame assembly 32 can be configured with mounting points for the front suspension components and any appropriate components/ systems, such as but not limited to portions of the body 12, a front final drive assembly, steering system components, engine cooling system, headlights, etc.

The front bumper assembly 34 can be connected to the front end of the front frame assembly 32, such that the front frame assembly 32 can be located between the front bumper assembly 34 and the main frame assembly 30. The front bumper assembly 34 can extend beyond the exterior of the body 12, or alternatively, one or more portions of the body 12 can conceal the front bumper assembly 34.

The rear frame assembly 36 can be connected to the rear end of the main frame assembly 30 such that the passenger compartment is located between the front frame assembly 32 and the rear frame assembly 36. The rear frame assembly 36 can be configured with mounting points for the rear suspension components and any appropriate components/systems, such as but not limited to portions of the body 12, a rear final drive assembly, taillights, etc.

The main frame assembly 30, front frame assembly 32, front bumper assembly 34 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

A. Main Frame Assembly

Figure 3:
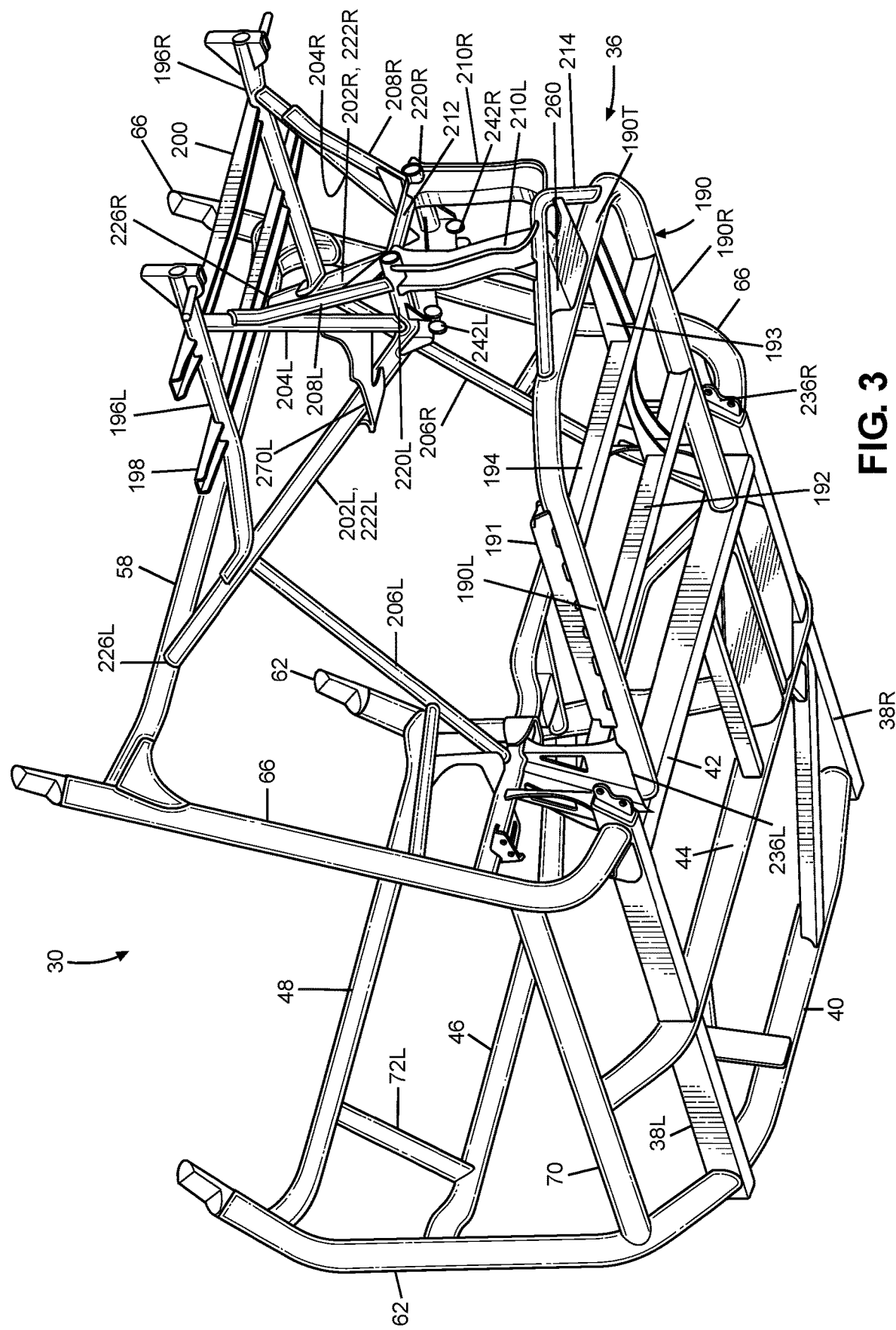
FIG. 3 is perspective lower rear view of a portion of the frame assembly of FIG. 2.

FIG. 3 is a perspective view of the frame assembly 18 with the upper portion of the roll cage 28 removed for simplicity and clarity of the drawing. Referring to FIGS. 2 and 3, the main frame assembly 30 can define the passenger area and can include the roll cage 28, a pair of longitudinal members 38L, 38R and a plurality of lower cross members 40, 42, 44, a pair of upper cross members 46, 48 and a pair of support members 72L, 72R.

The longitudinal members 38L, 38R can extend in the longitudinal direction L of the vehicle 10, from the front of the passenger area to the rear of the passenger area. The longitudinal members 38L, 38R can each be configured as a substantially straight, hollow beam having a substantially rectangular cross-sectional shape.

The first through third lower cross members 40, 42, 44 can extend in the transverse direction T of the vehicle 10, from the left longitudinal member 38L to the right longitudinal member 38R. The first lower cross member 40 can be slightly bent along the longitudinal direction L near each end toward the rear of the vehicle 10. The first lower cross member 40 can be a hollow tube having a substantially circular cross-sectional shape. The second and third lower cross members 42, 44 can be configured as a substantially straight, hollow beam having a substantially rectangular cross-sectional shape.

The first lower cross member 40 can be connected to each of the longitudinal members 38L, 38R adjacent a respective front end of the longitudinal members 38L, 38R.

The second lower cross member 42 can be connected to each of the longitudinal members 38L, 38R adjacent a respective rear end of the longitudinal members 38L, 38R. The third lower cross member 44 can be connected to each of the longitudinal members 38L, 38R at a portion of the longitudinal members 38L, 38R intermediate the front and rear ends of the respective longitudinal members 38L, 38R. In the exemplary embodiment of FIG. 2, welds can connect the lower cross members 40, 42, 44 to the longitudinal members 38L, 38R.

The first and second upper cross members 46, 48 can extend in the transverse direction T of the vehicle 10 from the left cage side assembly 50L to the right cage side assembly 50R. The first upper cross member 46 can be spaced away from the second upper cross member 48. The second upper cross member 48 can be connected to the cage side assemblies 50L, 50R at a position that is higher in the vertical direction V of the vehicle 10 than the position at which the first upper cross member 46 is connected to the side assemblies 50L, 50R.

The support members 72L, 72R can extend generally in the vertical direction V of the vehicle 10 from the first upper cross member 46 to the second upper cross member 48. The support member 72L, 72R can be spaced apart from each other in the transverse direction T of the vehicle 10. The support members 72L, 72R can each be configured as a hollow tube having a substantially circular cross-sectional shape. In the exemplary embodiment of FIG. 2, welds can connect the support members 72L, 72R to the upper cross members 46, 48.

The upper cross members 46, 48 and the support members 72L, 72R can be configured to support and secure a panel assembly (such as but not limited to an instrument panel assembly), a steering assembly, and/or a portion of the body 12 (such as but not limited to a hood panel 13—see FIG. 1).

The roll cage 28 can include a pair of cage side assemblies 50L, 50R, a plurality of cage cross members 52, 54, 56, 58, 60. The roll cage 28 generally defines the passenger compartment.

The cage side assemblies 50L, 50R can extend in the longitudinal direction L of the vehicle 10, from the front end of the passenger area to the rear end of the passenger area. The cage side assemblies 50L, 50R can define the limits of the passenger area in the transverse direction T of the vehicle 10, the longitudinal direction L of the vehicle 10 and in the vertical direction V of the vehicle 10. The cage side assemblies 50L, 50R can be configured to support the door assemblies 20L, 20R and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The cage side assemblies 50L, 50R can be configured to resist, impede, or minimize deformation that could be caused by a load or kinetic energy input into either or both of the cage side assemblies.

Each of the cage side assemblies 50L, 50R can be formed from any appropriate number of structural elements, from one to any number greater than one. The side cage assemblies 50L, 50R can be configured with any shape and contour that can be advantageous to meet the structural performance and aesthetic appeal desired for the vehicle 10. The following description will be directed toward the left cage side assembly 50L with the understanding that the right cage side assembly 50R can be a mirror image of the left cage side assembly 50L.

The left cage side assembly 50L can include a plurality of cage side members 62, 64, 66, 68, 70. Each of the first through fifth cage side members 62, 64, 66, 68, 70 can be configured as a hollow tube having a substantially circular cross-section shape. The cage side members 62, 64, 66, 68, 70 can be configured with any appropriate elongated shape that can provide the desired dimensionality of the passenger area and advantageously conform to the aesthetic appearance desired for the vehicle 10.

The first cage side member 62 can be referred to as an A-pillar. The first cage side member 62 can be connected at one end to the left longitudinal member 38L adjacent the front end of the left longitudinal member 38L. The first cage side member 62 can be connected to a side of the left longitudinal member 38L that can be opposite to the side to which the first cross member 40 is connected. The one end of the first cage side member 62 can be aligned in the transverse direction T with the end of the first cross member 40 that is connected to the left longitudinal member 38L.

Each of the upper cross members 46, 48 can be connected to a middle portion of the first cage side member 62 of each of the cage side assemblies 50L, 50R.

The third cage side member 66 can be referred to as a B-pillar. The third cage side member 66 can be connected at one end to the left longitudinal member 38L adjacent the rear end of the left longitudinal member 38L. The third cage side member 66 can be connected to a side of the left longitudinal member 38L that can be opposite to the side to which the second lower cross member 42 is connected. The one end of the third cage side member 66 can be aligned in the transverse direction T with the end of the second cross member 42 that is connected to the left longitudinal member 38L.

The first through fifth cage cross members 52, 54, 56, 58, 60 can extend in the transverse direction T of the vehicle 10 from the left side assembly 50L to the right side assembly 50R. The cage cross members 52, 54, 56, 58, 60 can be connected to each of the side assemblies 50L, 50R at respective locations spaced apart along the longitudinal direction L of the vehicle 10. The cage cross members 52, 54, 56, 58, 60 can be configured to maintain a predetermined spacing between the left cage side assembly 50L and the right cage side assembly 50R in the transverse direction T. The cage cross members 52, 54, 56, 58, 60 can define the limits of the passenger area in the longitudinal direction L of the vehicle 10 and the vertical direction V of the vehicle 10. The cage cross members 52, 54, 56, 58, 60 can be configured to manage load and/or energy inputs so that deflection of the frame assembly 18 in the vicinity of the passenger area can be controlled in an advantageous predetermined manner. In the exemplary embodiment of FIG. 2, the cage cross members 52, 54, 56, 58, 60 can be connected to the cage side assemblies 50L, 50R by welding.

B. Front Frame Assembly

Referring to FIG. 2, the front frame assembly 32 can be connected to the first lower cross member 40 and each of the first cage side members 62 of the main frame assembly 30. The front frame assembly 32 can include the front bumper assembly 34, a pair of front lower members 74L, 74R, a pair of first front members 76L, 76R, a pair of second front members 78L, 78R, a pair of intermediate members 80L, 80R and a transverse frame assembly 82.

The front frame members 76L, 76R, 78L, 78R can be spaced apart from each other in the transverse direction T of the vehicle 10 by a predetermined distance sufficient to accommodate any component(s) and/or system(s) to be supported by the front frame assembly 32. The front frame assembly 32 can be configured to support a front suspension and wheel assembly, and other components such as but not limited to a radiator, a steering rack assembly and a front final drive assembly. The front suspension and wheel assembly can include, at least one suspension member on each side of the front frame assembly 32, a damper and spring assembly on each side of the front frame assembly 32, a front hub assembly on each side of the front frame assembly 32, and the front wheels 14L, 14R.

In the exemplary embodiment of FIG. 2, each of the front lower frame members 74L, 74R, the first front frame members 76L, 76R, the second front frame members 78L, 78R are configured as hollow metal tubes having a substantially circular cross-section. However, any combination of the front lower frame members 74L, 74R, the first front frame members 76L, 76R and the second front frame members 78L, 78R can be have a cross-sectional shape that is different from a substantially circular cross-sectional shape. Further, any combination of the front lower frame members 74L, 74R, the first front frame members 76L, 76R and the second front frame members 78L, 78R can be formed of a material other than metal, such as but not limited to carbon fiber, plastic, carbon fiber reinforced plastic, ceramic, pulp, or glass fiber reinforced plastic.

Further, the front lower frame members 74L, 74R, the first front frame members 76L, 76R, the second front frame members 78L, 78R can be welded to each other to form the structure described above. However, embodiments are intended to include or otherwise cover any combination of the front lower frame members 74L, 74R, the first front frame members 76L, 76R and the second front frame members 78L, 78R connected by threaded fasteners, adhesives, a combination of brackets and threaded fasteners, rivets, or other known connective structures, materials, or methods.

C. Front Bumper Assembly

The front frame assembly 32 can include the front bumper assembly 34. Referring to FIG. 2, the front bumper assembly 34 can be connected to the front side of the first frame members 76L, 76R, such that the first and second frame members 76L, 76R, 78L, 78R are located between or intermediate the front bumper assembly 34 and the main frame assembly 30.

The front bumper assembly 34 can be configured to deform in a predetermined and controlled manner in response to load or kinetic energy input to the front bumper assembly 34 that exceeds a predetermined threshold.

D. Rear Frame Assembly

Referring to FIGS. 2 and 3, the rear frame assembly 36 can include rear lower frame member 190, a first lower cross frame member 192, a second lower cross frame member 194, a pair of bed frame members 196L, 196R, a first bed cross member 198, a second bed cross member 200, a pair of first rear frame members 202L, 202R, a pair of second rear frame members 204L, 204R, a pair of third rear frame members 206L, 206R, a pair of fourth rear frame members 208L, 208R, a pair of rear connecting frame members 210L, 210R, a rear cross frame member 212 and rear extension frame member 214. The first rear frame members 202L, 202R and the second rear frame members can be referred to a first upper frame members and second upper frame members, respectively.

The rear lower frame member 190 can be connected to and can extend away from the main frame assembly 30 in the longitudinal direction L of the vehicle 10. The rear lower frame member 190 can have two side portions 190L, 190R and a cross portion 190T arranged in generally U-shaped configuration such that the cross portion 190T extends between the side portions 190L 190R.

The side portions 190L, 190R can extend along the longitudinal direction L of the vehicle 10. The side portions 190L, 190R can be spaced apart in the transverse direction T of the vehicle 10. Each of the side portions 190L, 190R can be connected to the second lower cross member 42 at positions spaced inboard of the longitudinal members 38L, 38R in the transverse direction T of the vehicle 10. The side portions 190L 190R can be connected to the second lower cross member 42 in any appropriate manner such as but not limited to welding, adhesives, mechanical fasteners, etc. The side portions 190L, 190R can be referred to as first lower frame members.

The cross portion 190T can extend along the transverse direction T of the vehicle 10. The cross portion 190T can extend from each of the side portions 190L, 190R. In the exemplary embodiment of FIGS. 2-9, the cross portion 190T can have an angled portion at each end that transitions into the side portions 190L, 190R along short bends. The cross portion 190T can be referred to as a second lower frame member.

Alternatively, each of the side portions 190L, 190R can include a respective angled portion that transitions into the cross portion 190T along a short bend. In another alternate embodiment, the angled portions can be omitted such that cross portion 190T transitions directly into each of the side portions 190L, 190R along a right angled or other short bend.

As shown in the exemplary embodiment of FIG. 2, the lower frame member 190 can be a single homogenous piece formed by bending a hollow pipe. In accordance with the disclosed subject matter, the lower frame member 190 can be formed from a plurality of sections that are subsequently fastened together in any appropriate manner such as but not limited to welding, adhesives, mechanical fasteners, etc. The individual sections can be formed in the desired shape by any appropriate process such as but not limited to pipe bending, casting, forging, hydroforming, etc.

The first and second lower cross frame members 192, 194 can be connected to and/or form the rear lower frame member 190 at respective locations that are spaced apart in the longitudinal direction L of the vehicle 10. The first and second lower cross frame members 192, 194 can extend in the transverse direction T of the vehicle 10 from each of the side portions 190L, 190R. The first cross frame member 192 can be located between the second lower cross member 42 and the second lower cross member 194.

The rear lower frame member 190 and the lower cross frame members 192, 194 can be configured to support a powertrain assembly. For example, FIGS. 5-9 show an exemplary powertrain that includes a final drive structure 216. Further, the exemplary powertrain can include a power source such as but not limited to an internal combustion engine (having a single cylinder or a plurality of cylinders), an electric motor, or a hybrid system that includes an internal combustion engine and an electric motor. FIG. 7 schematically represents a power source 218 in phantom. A transmission can be connected to and between each of the power source 218 and the final drive structure 216. The transmission can include various types of transmissions including a stepped speed ratio assembly or a continuously variable speed ratio assembly. The transmission can be configured as an automatic transmission, a manual transmission, or a semi-automatic transmission. As will be discussed in detail below, the power source 218 and the transmission can be connected to the rear lower frame member 190 in any appropriate manner such as but not limited to brackets and mechanical fasteners, welds, rivets, rubber mounting assembly(ies), fluid filled mounting assembly(ies), or any combination thereof.

In the exemplary embodiment shown in FIG. 7, the power source 218 and the transmission can be mounted on a left rail 191 and a right rail 193. The left rail 191 can be mounted to the left side portion 190L of the rear lower frame member 190. The right rail can be mounted to each of first lower cross member 192, the second lower cross member 194 and the cross portion 190T of the rear lower frame member 190. The right rail 193 can be spaced inward away from the right side portion 190R in the transverse direction T of the vehicle 10. One or more engine mounts can be connected between the power source 218 and each of the rails 191, 193. The transmission can be connected to one or both of the rails 191, 193 by one or more mounting assemblies. However, in accordance with other embodiments of the disclosed subject matter, the transmission can be connected to the power source 218 and/or the final drive structure 216 such that the power source and/or the final drive structure supports the transmission.

Referring to FIGS. 2 and 3, the bed frame members 196L, 196R and the first and second cross frame members 198, 200 can form a bed frame assembly of the vehicle 10. The body 12 can include a cargo or storage area that is mounted on the bed frame assembly. The first rear frame members 202L, 202R, the second rear frame members 204L, 204R, and the fourth rear frame members 208L, 208R can support the bed frame assembly.

Each of the bed frame members 196L, 196R can be connected to and can extend from a respective one of the first rear frame members 202L, 202R and a respective one of the second rear frame members 204L, 204R. Each of the bed frame members 196L, 196R can extend from the respective one of the first rear frame members 202L, 202R in the longitudinal direction L of the vehicle 10. The bed frame members 196L, 196R can be spaced apart in the transverse direction T of the vehicle.

The first and second bed cross members 198, 200 can be connected to and can extend from each of the bed frame members 196L, 196R in the transverse direction T of the vehicle 10. The first and second bed cross members 198, 200 can be spaced apart from each other in the longitudinal direction L of the vehicle 10.

The first rear frame members 202L, 202R can be configured to support a load input by the final drive structure 216 and transfer at least a portion of the load to the main frame assembly 30. The first rear frame members 202L, 202R can be directly connected to the main frame assembly 30 and the final drive structure 216. For example, the first rear frame members 202L, 202R can be connected to the fourth cage cross member 58 in any appropriate manner such as but not limited to welding, adhesives, mechanical fasteners, etc. The connection between the first rear frame members 202L, 202R and the final drive structure 216 will be discussed in further detail below.

Referring to FIGS. 2-9, the first rear frame members 202L, 202R can be mirror images of each other. The first rear frame members 202L, 202R can extend away the main frame assembly 30 and toward the final drive structure 216 along the longitudinal direction L of the vehicle 10. Each of first rear frame members 202L, 202R can include a first portion 220L, 220R and a second portion 222L, 222R.

Figure 9:
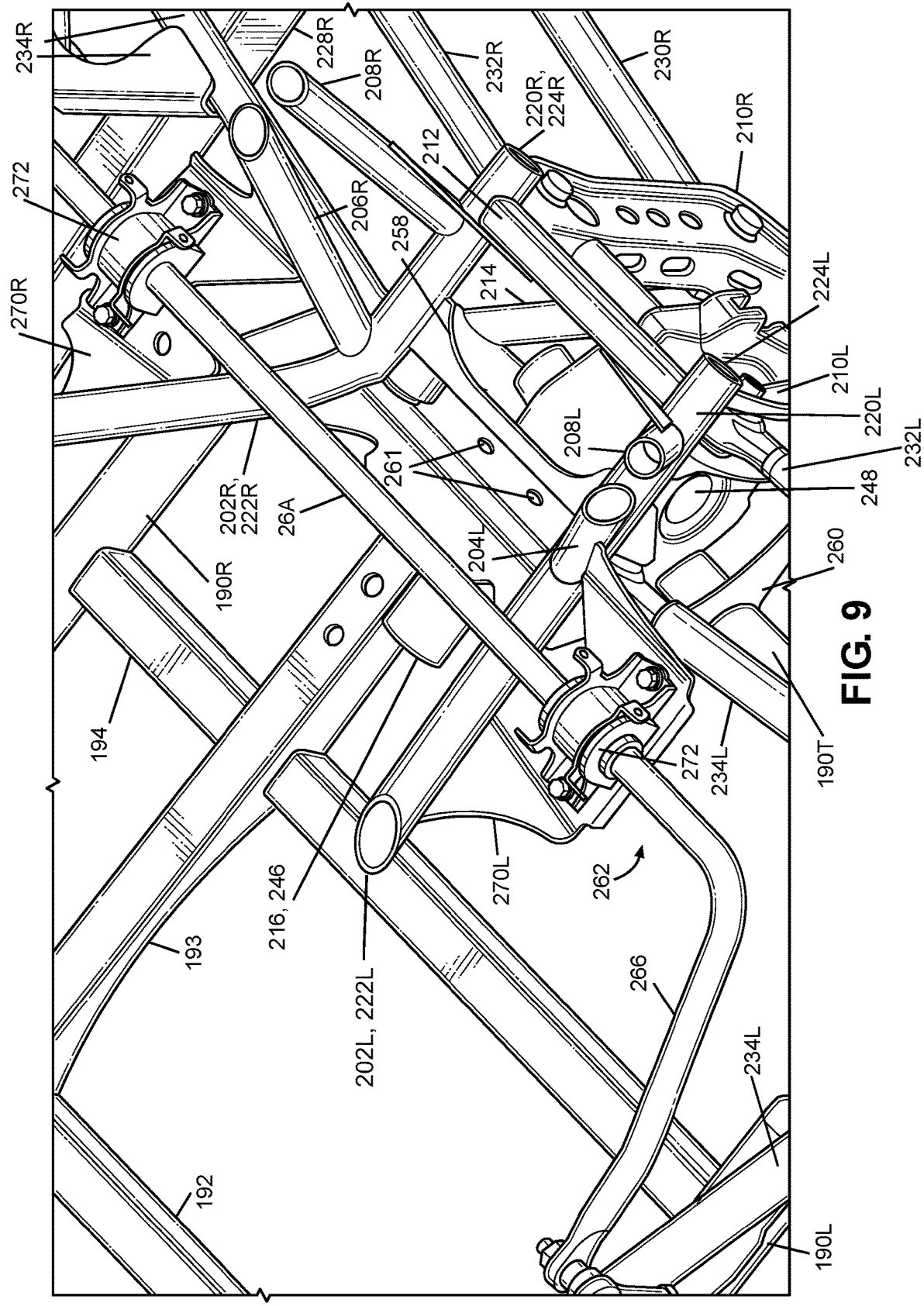
FIG. 9 is a perspective view of an enlarged portion of the frame and suspension assembly of FIG. 7.

Each of the first portions 220L, 220R can extend along a longitudinal direction L of the vehicle 10. Referring to FIG. 9, each of the first portions 220L, 220R can extend from the second portion 222L, 222R and can terminate at a first end 224L, 224R. The first rear frame members 202L, 202R can be spaced apart in the transverse direction T of the vehicle 10 such that the first ends 224L, 224R of the first rear frame members 202L, 202R are spaced apart by a first distance.

Referring to FIGS. 2-9, each of the second portions 222L, 222R can extend at an angle from the first portion 220L, 220R such that the second portion 222L, 222R extends along the longitudinal direction L and a vertical direction V of the vehicle 10. However, the second portion 222L, 222R of each of the first rear frame members 202L, 202R can extend from the first portion 220L, 220R of each of the first rear frame members 202L, 202R along each of the longitudinal direction L, the vertical direction V, and the transverse direction T of the vehicle 10. Referring to FIG. 3, each of the second portions 222L, 222R can terminate at a second end 226L, 226R such that the second ends 226L, 226R of the first rear frame members 202L, 202R are spaced apart in the transverse direction T of the vehicle 10 by a second distance that is greater than the first distance.

Referring to FIGS. 2-9, each of the second rear frame members 204L, 204R can be connected to a respective one of the first rear frame members 202L, 202R and can extend upwardly away from the respective one of the first rear frame members 202L, 202R along the vertical direction V of the vehicle 10. Each of the second rear frame members 204L, 204R can extend along each of the longitudinal direction L, the transverse direction T and the vertical direction V of the vehicle 10 from a respective one of the first rear frame members 202L, 202R to a respective one of the bed frame members 196L, 196R.

Referring to FIGS. 2-9, each of the third rear frame members 206L, 206R can be connected to and can extend from the main frame assembly 30 and a respective one of the first rear frame members 202L, 202R. Each of the third rear frame members 206L, 206R can extend along each of the longitudinal direction L, the transverse direction T and the vertical direction V of the vehicle 10. Each of the third rear frame members 206L, 206R can be connected to a respective one of the second portions 222L, 222R of the first rear frame members 202L, 202R. For example, each of the third rear frame members 206L, 206R can be connected to a respective one of the second portions 222L, 222R at a location that is closer to the respective one of the second ends 226L, 226R than to the respective one of the first portions 220L, 220R of the first rear frame members 202L, 202R.

Each of the fourth rear frame members 208L, 208R can be connected to and extend from a respective one of the first rear frame members 202L, 202R and a respective one of the second frame members 204L, 204R. Each of the fourth rear frame members 208L, 208R can along each of the longitudinal direction L, the transverse direction T and the vertical direction V of the vehicle 10.

The lower frame member 190 can include an extension frame member 214. The extension frame member 214 can be connected to and can extend away from the cross portion 190T of the lower frame member 190. The extension frame member 214 can have a general V-shape with the base of the general V-shaped facing away from the cross portion 190T in the longitudinal direction L of the vehicle 10.

Each of the rear connecting frame members 210L, 210R can be connected to and extend from the rear lower frame member 190 and a respective one of the first rear frame members 202L, 202R. For example, each of the rear connecting frame members 210L, 210R can be connected to the extension frame member 214 and a respective one of the first portions 220L, 220R of the first rear frame members 202L, 202R.

The rear cross frame member 212 can be connected to and can extend from each of the first rear frame members 202L, 202R in the transverse direction T of the vehicle 10. The rear cross frame member 212 can be connected to each of the first portions 220L, 220R of the first rear frame members 202L, 202R. Each of the rear connecting frame members 210L, 210R can be connected to the rear cross frame member 212.

III. Front and Rear Suspension and Wheel Assemblies

The vehicle 10 can include a front suspension and wheel assembly and a rear suspension and wheel assembly. As discussed above, the front suspension and wheel assembly can be connected to the front frame assembly 32. At least a portion of the rear suspension and wheel assembly can be mounted to the rear frame assembly 36.

The suspension members of the front suspension and wheel assembly can be configured as a double-wishbone suspension system (also referred to as upper and lower A-arms). However, the disclosed subject matter includes or otherwise covers suspension members that provide a different geometry and/or include multiple links, a strut, or other appropriate members in order to achieve the desired suspension performance so long as at least one of the suspension members is mounted to each side of the front frame assembly 32.

The rear suspension and wheel assembly can include the rear wheels 16L, 16R, at least one suspension member for each of the rear wheels 16L, 16R. In the exemplary embodiment of FIGS. 4 and 5, the rear suspension and wheel assembly can include a pair of first rear suspension members 228L, 228R, a pair of second rear suspension members 230L, 230R, a pair of third rear suspension members 232L, 232R and a pair of fourth rear suspension members 234L, 234R such that one of each pair is connected on a respective side of the frame assembly 18.

Figure 4:
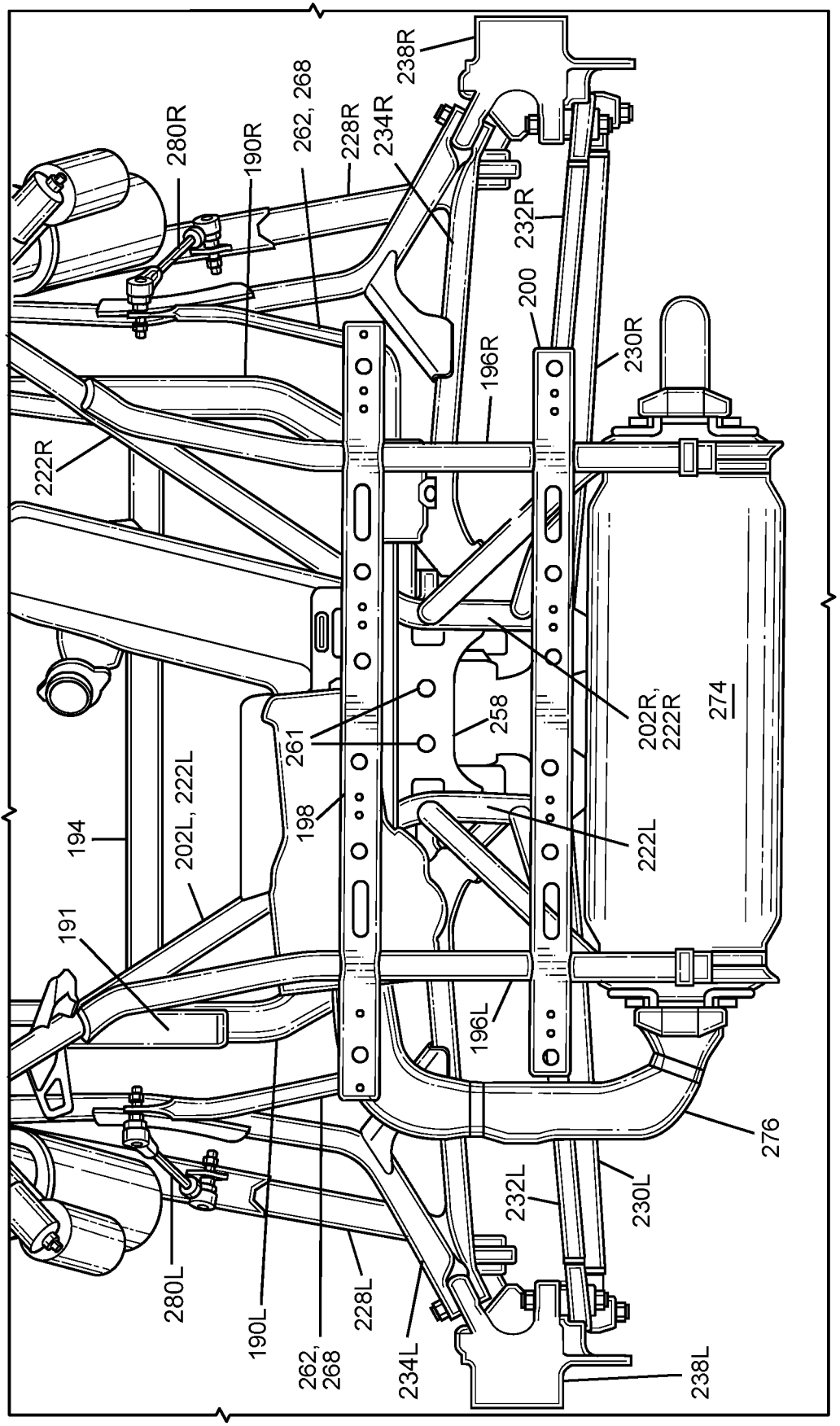
FIG. 4 is a top view of a rear portion of the frame and suspension assembly of the vehicle of FIG. 1.
Figure 5:
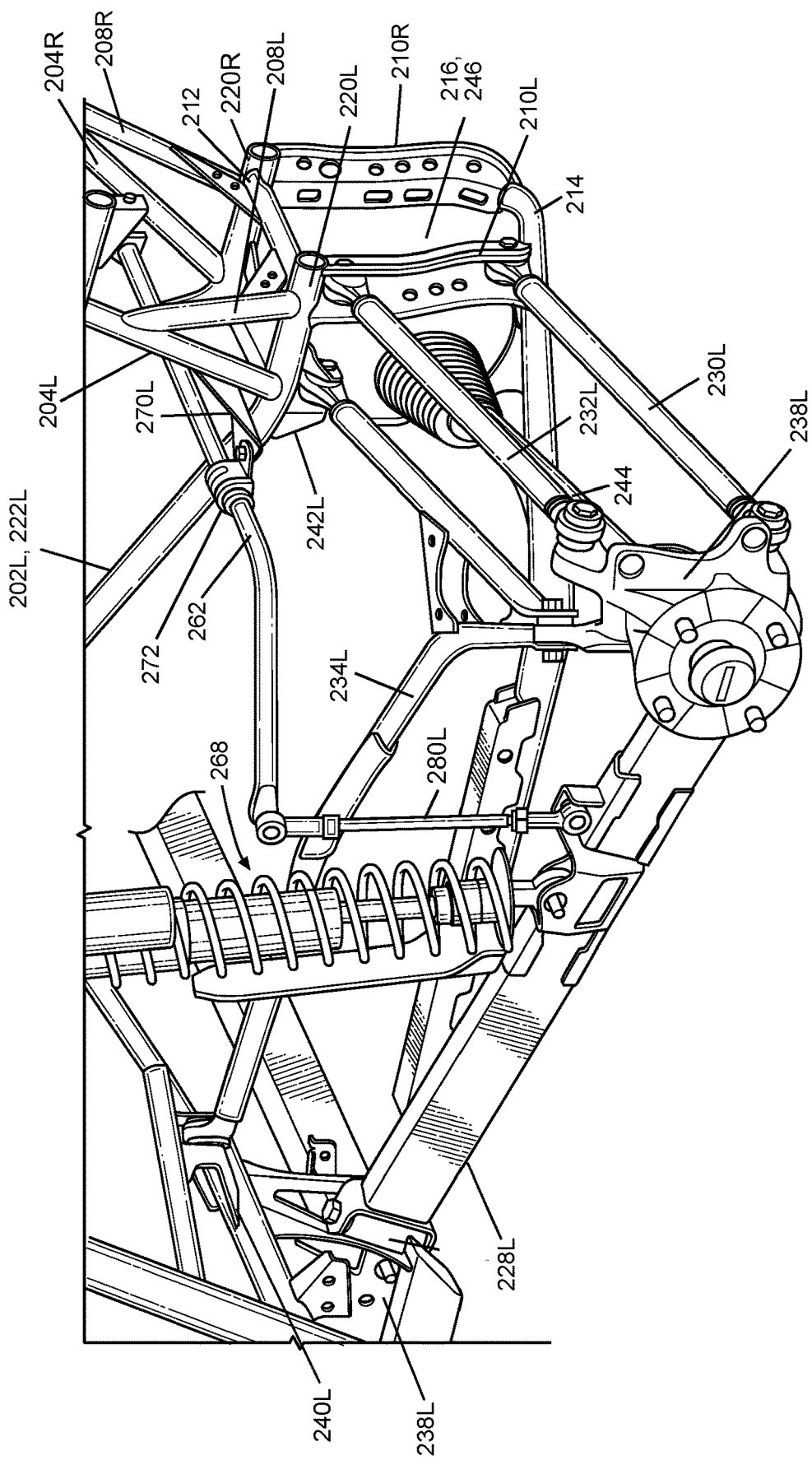
FIG. 5 is a perspective upper view of a rear portion of the frame and suspension assembly of the vehicle of FIG. 1.

The rear suspension and wheel assembly are described with reference to FIGS. 4-6. FIG. 4 shows that the right side of the rear suspension and wheel assembly can be a mirror image of the left side of the rear suspension and wheel assembly. The portion of the rear suspension and wheel assembly that is connected to the main frame assembly 30 is not shown in FIG. 4. FIG. 5 shows the left side of the rear suspension and wheel assembly, with the right side of the rear suspension and wheel assembly and the right half of the rear frame assembly 36 omitted for simplicity and clarity of the drawing. FIG. 5 shows a left left-side portion of the rear suspension and wheel assembly that is omitted from FIG. 4. The portion of the rear suspension and wheel assembly that is connected to the main frame assembly 30 is not shown in FIG. 6.

Each of the first rear suspension members 228L, 228R can be referred to as a trailing arm. Each of the first rear suspension members 228L, 228R can be configured as a substantially straight link that has a rectangular cross-section and can be hollow or solid. The first rear suspension members 228L, 228R can be connected to a rear end portion of the main frame assembly 30 and can be connected to a respective one of the rear wheels 16L, 16R. Referring to FIGS. 2, 3 and 5, the main frame assembly 30 can include a pair of first suspension brackets 236L, 236R mounted to the main frame assembly 30. For example, each of the first suspension brackets 236L, 236R can be connected to the $2^{nd}$ lower cross frame member 42 and to a respective one of the longitudinal members 38L, 38R. Each of the first rear suspension members 228L, 228R can be connected to a respective one of the first suspension brackets 236L, 236R such that the first rear suspension members 228L, 228R can pivot relative to each of the first suspension brackets 236L, 236R, the main frame assembly 30 and the rear frame assembly 36.

Figure 6:
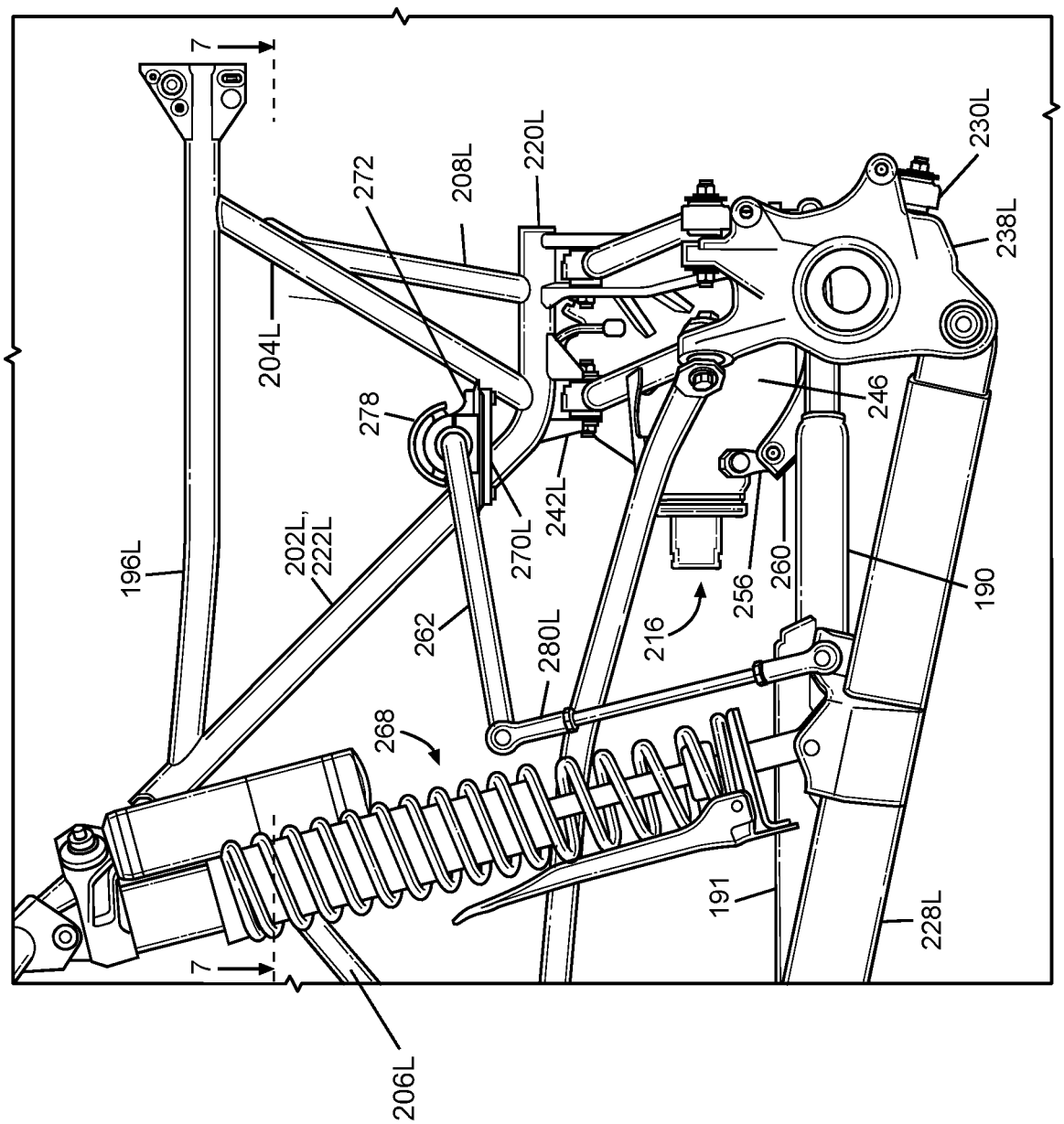
FIG. 6 is a side view of a rear portion of the frame and suspension assembly of the vehicle of FIG. 1.
Figure 7:
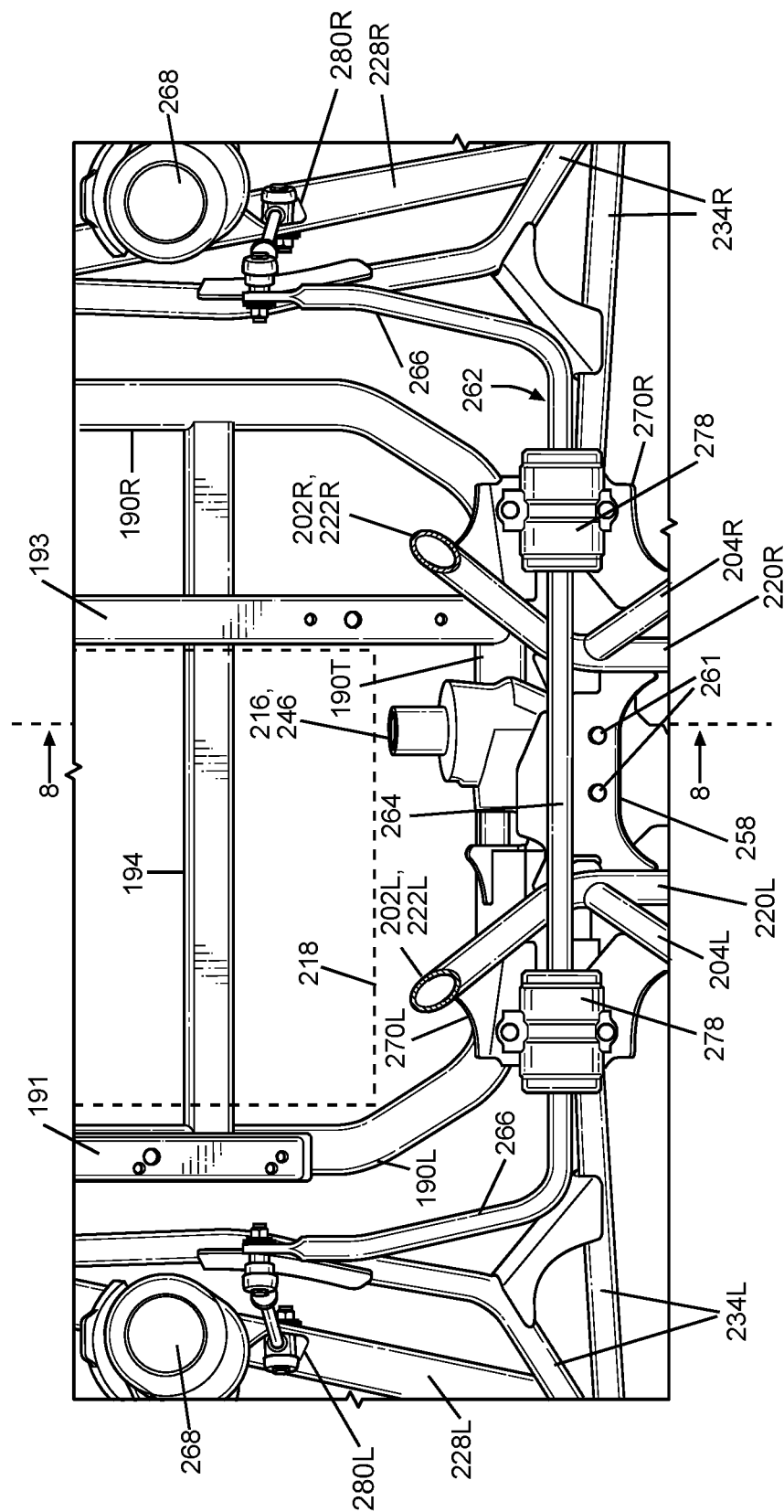
FIG. 7 is a top view of a rear portion of the frame and suspension assembly of the vehicle of FIG. 1.

Referring to FIGS. 4-6, the rear suspension and wheel assembly can include a pair of knuckles 238L, 238R. Each of the first rear suspension members 228L, 228R can be connected to a respective one of the knuckles 238L, 238R in any appropriate manner such that each knuckle 238L, 238R moves with a respective one of the first rear suspension members 228L, 228R, and pivots relative to the respective one of the first rear suspension members 228L, 228R.

The first suspension brackets 236L, 236R can be spaced apart from each other in the transverse direction T of the vehicle 10 such that the first rear suspension members 228L, 228R are spaced apart from each other in the transverse direction T of the vehicle 10. Each of the first rear suspension members 228L, 228R can extend from the main frame assembly 30 to the respective one of the knuckles 238L, 238R along the longitudinal direction L of the vehicle 10. Each of the first rear suspension members 228L, 228R can be spaced outwardly from a respective one of the side portions 190L, 190R of the rear lower frame member 190.

Each of the second rear suspension members 230L, 230R can be referred to as a lateral link or a transverse link. Each of the second rear suspension members 230L, 230R can be configured as a substantially straight rod. Each of the second rear suspension members 230L, 230R can be hollow or solid. The second rear suspension members 230L, 230R can be connected to each of the rear frame assembly 36 and a respective one of the rear wheels 16L, 16R. For example, each of the second rear suspension members 230L, 230R can be connected to a respective one of the rear connecting frame members 210L, 210R in any appropriate manner that permits the second suspension members 230L, 230R to pivot relative to the rear connecting frame members 210L, 210R. Each of the second rear suspension members 230L, 230R can be connected to a respective one of the knuckles 238L, 238R in any appropriate manner such that each knuckle 238L, 238R moves with the respective one the second rear suspension members 230L, 230R, and pivots relative to the respective one of the second rear suspension members 230L, 230R. The second rear suspension members 230L, 230R can extend along the transverse direction T of the vehicle 10.

Each of the third rear suspension members 232L, 232R can be referred to as a lateral link or a transverse link. Each of the third rear suspension members 232L, 232R can be configured as a substantially straight rod and can be hollow or solid. The third rear suspension members 232L, 232R can be connected to each of the rear frame assembly 36 and a respective one of the rear wheels 16L, 16R. For example, each of the third rear suspension members 232L, 232R can be connected to a respective one of the rear connecting frame members 210L, 210R in any appropriate manner that permits the third rear suspension members 232L, 232R to pivot relative to the rear connecting frame members 210L, 210R. Each of the third rear suspension members 232L, 232R can be connected to a respective one of the knuckles 238L, 238R in any appropriate manner such that each knuckle 238L, 238R moves with the respective one the third rear suspension members 232L, 232R, and pivots relative to the respective one of the third rear suspension members 232L, 232R. The third rear suspension members 232L, 232R can extend along the transverse direction T of the vehicle 10. Each of the third rear suspension members 232L, 232R can be spaced away from and above a respective one of the second rear suspension members 230L, 230R in the vertical direction V of the vehicle 10. Each of the third rear suspension members 232L, 232R can extend substantially parallel to the respective one of the second rear suspension members 230L, 230R.

Each of the fourth suspension members 234L, 234R can be referred to as an upper A-arm, or an upper wishbone. Each of the fourth suspension members 234L, 234R can be connected to teach of the main frame assembly 30 the rear frame assembly 36 and a respective one of the knuckles 238L, 238R. The fourth rear suspension members 234L, 234R can be connected to each of the rear frame assembly 36 and a respective one of the rear wheels 16L, 16R.

For example, the main frame assembly 30 can include a pair of second suspension brackets mounted above the first suspension brackets. FIG. 5 shows an exemplary second suspension bracket 240L mounted on the left side of the main frame assembly 30 above the left-side first suspension bracket 236L. A mirror image of the left-side second suspension bracket 240L can be mounted on the right side of the main frame assembly 30 above the right-side first suspension bracket 236R. Referring to FIGS. 3, 5 and 6, the rear frame assembly 36 can include a pair of third suspension bracket 242L, 242R. (The right-side third suspension bracket 242R is omitted from FIG. 5 and obstructed from view in FIG. 6). A first end of each of the fourth rear suspension members 234L, 234R can be connected to a respective one of the second suspension brackets in any appropriate manner such that the fourth rear suspension members 234L, 234R can pivot relative to the main frame assembly 30. A second end of each of the fourth rear suspension members 234L, 234R can be connected to a respective one the third suspension brackets 242L, 242R in any appropriate manner such that the fourth rear suspension members 234L, 234R can pivot relative to the rear frame assembly 36. A third end of the fourth rear suspension members 234L, 234R can be connected to a respective one of the knuckles in any appropriate manner such that each knuckle 238L, 238R moves with a respective one the fourth rear suspension members 234L, 234R, and pivots relative to the respective one of the fourth rear suspension members 234L, 234R.

In another exemplary embodiment, the fourth rear suspension members 234L, 234R can be omitted from the rear suspension and wheel assembly.

The rear suspension and wheel assembly can further include a stabilizer bar 262. The stabilizer bar 262 can be mounted to the rear frame assembly 36 and can be connected to each of the first rear suspension members 228L, 228R, directly or indirectly. The stabilizer bar 262 (also referred to as an anti-roll bar, or an anti-sway bar) can be a relatively rigid member that is configured to resist a torsional input caused by body roll while also being compliant to a torsional input caused by the displacement of one or both of the rear wheels 16L, 16R as the vehicle 10 travels along uneven terrain. For example, if the left-side first rear suspension member 228L moves in a direction that is opposite to the direction in which the first rear suspension member 228R moves, then a torsional load is input to the stabilizer bar 262. The stabilizer bar 262 can be tuned to absorb or resist this torsional input such that the relatively opposite movements of the left-side and right-side first rear suspensions members 228L, 228R can be reduced or resisted, thereby reducing or resisting an amount of body roll during cornering. Further details of the stabilizer bar 262 and its relationship with other structures of the vehicle 10 will be described in detail below.

Referring to FIGS. 5-8, the rear suspension and wheel assembly can further include a pair of spring and damper assemblies 268. The spring and damper assemblies can be configured to lessen loads and energy input to the frame assembly 18 by the rear wheels 16L, 16R. A first end of each of the spring and damper assemblies 268 can be connected to the main frame assembly 30 and second end of each of the spring and damper assemblies 268 can be connected to a respective one of the first rear suspension members 228L, 228R.

IV. Final Drive Assembly

The vehicle 10 can include a final drive assembly that can transfer torque output by the power source 218 to each of the rear wheels 16L, 16R. Referring to FIG. 5, the final drive assembly can include the final drive structure 216 and a pair of driveshafts 244. FIG. 5 only shows the left-side driveshaft 244. Each of the drive shafts 244 can extend from and be connected to final drive structure 216 and a respective one of the knuckle 238L, 238R such that the driveshafts 244 transmit torque from the final drive structure 216 to a respective one of the rear wheels 16L, 16R.

Figure 8:
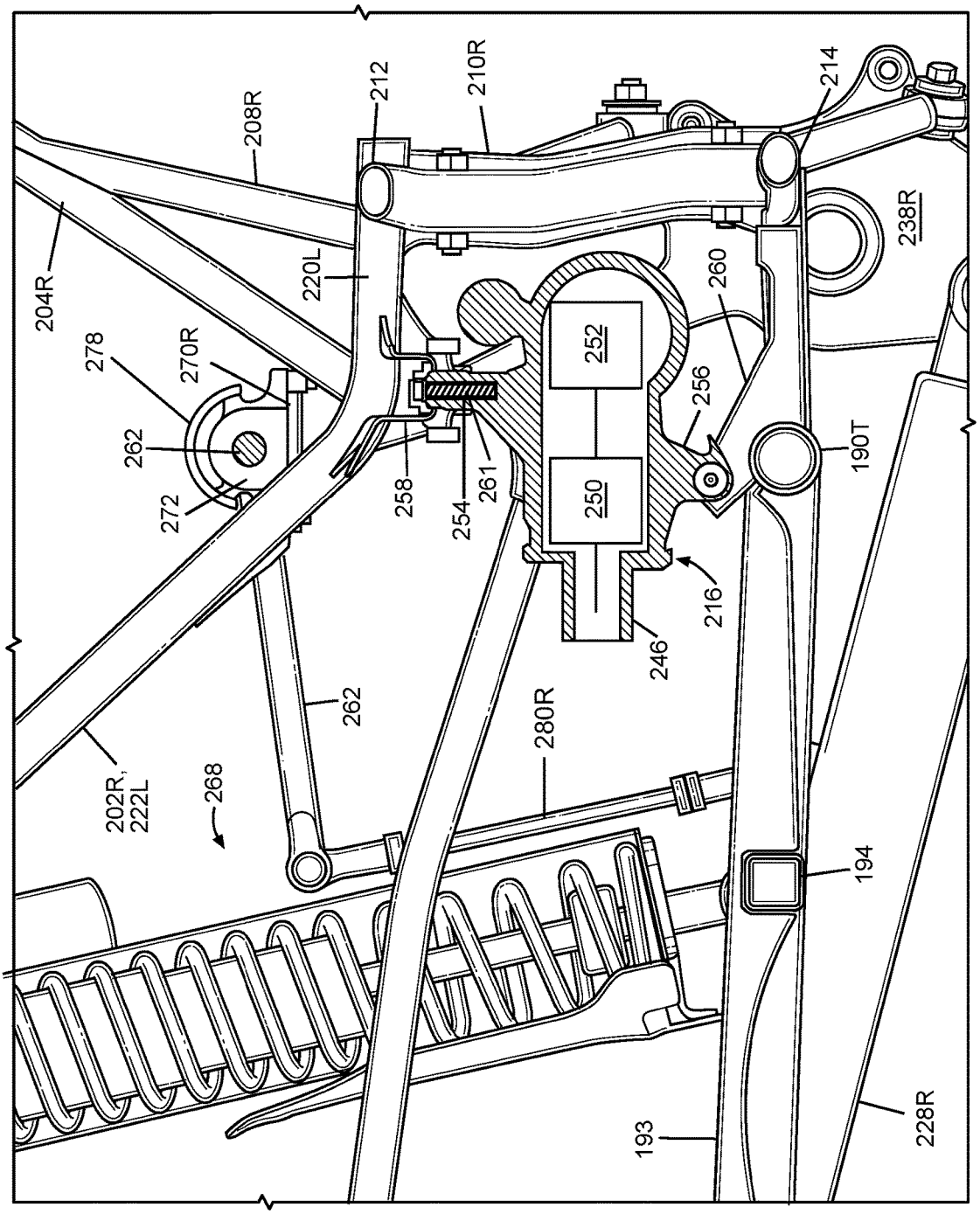
FIG. 8 is a cross-sectional view of the frame and suspension assembly of FIG. 7 taken along line 8-8.

Referring to FIGS. 5-9, the final drive structure 216 can include a housing 246. Referring to FIG. 8, the housing 246 can contain any appropriate mechanism that can transmit torque input to the mechanism to each of the front wheels 14L, 14R. For example, the housing 246 can contain an input structure 250 and an output structure 252. The input structure 250 can be configured to receive torque from a power source 218. The output structure 252 can be configured to transfer at least a portion of the torque to at least one of the rear wheels 16L, 16R. The input structure 250 can include an input gear driven by the power source 218. The output structure 252 can be an output gear driven by the input gear. The output gear can drive one or each of a pair of driveshafts. In another example, a differential gear assembly can couple the output gear to each of the driveshafts such that each of the rear wheels 16L, 16R can be driven at different speeds and at different percentages of the torque input by the power source 218. In yet another example, a plurality of friction members can be arranged such that torque input by the power source 218 can be differentially distributed to each of the driveshafts.

Referring to FIG. 9, the housing 246 can include a pair of openings in the housing 246. Only the left-side opening 248 is shown in FIG. 9. But it is to be understood that the right-side opening 248 can be identical and located opposite to the left-side opening in the transverse direction T of the vehicle 10. The output structure 252 can extend from the housing 246 via each of the openings 248. Each of the driveshafts can be connected to the output structure at a location that is adjacent to a respective one of the openings 248. In an alternate embodiment, the output structure can be fully contained in the housing 246 and the driveshafts 244 can extend into the housing 246 through a respective one of the openings 248.

Referring to FIG. 8, the final drive structure 216 can include an upper mounting structure 254 and a lower mounting structure 256 that extend away from the housing 246 along the vertical direction V of the vehicle 10. The rear frame assembly 36 can include an upper mounting bracket 258 and a pair of lower mounting brackets 260. Referring to FIGS. 4 and 7-9, the upper mounting structure 254 can be connected to the upper mounting bracket 258 in any appropriate manner such as but not limited to one or more mechanical fasteners 261. The lower mounting structure 256 can be connected to each of the lower mounting brackets 260 in any appropriate manner such as but not limited to one or more mechanical fasteners.

The upper mounting bracket 258 can extend from and can be connected to each of the first rear frame members 202L, 202R. For example, the upper mounting bracket 258 can extend from and can be connected to each of first portions of the first rear frame members 202L, 202R. In the exemplary embodiment of FIGS. 7-9, the upper mounting bracket 258 and the third suspension brackets 242L, 242R can be integrated into a single homogenous bracket that can be stamped from a metal sheet.

Each of the lower mounting brackets 260 can be connected to rear lower frame member 190 and spaced apart from each other in the transverse direction T of the vehicle 10. For example, each of the lower mounting brackets 260 can be connected to and can extend from each of the cross portion 190T and the extension frame member 214. The lower mounting brackets 260 can be spaced apart from each other such that the housing 246 can be located between the lower mounting brackets 260.

V. Frame and Suspension Assembly

Referring to FIGS. 4-9, the vehicle 10 can include a frame and suspension assembly. FIG. 4 is a top view of a portion the frame and suspension assembly in which the main frame assembly 30 and the portions of the rear frame assembly 36 and the rear suspension and wheel assembly that are connected to main frame assembly are omitted from the view. FIG. 5 shows the left side of the rear suspension and wheel assembly, with the right side of the rear suspension and wheel assembly and the right half of the rear frame assembly 36 omitted for simplicity and clarity of the drawing. FIG. 5 shows left left-side portion of the rear suspension and wheel assembly that is omitted from FIG. 4. The portion of the rear suspension and wheel assembly that is connected to the main frame assembly 30 is not shown in FIG. 6. FIG. 7 is a top view of the a portion of FIG. 4 with the upper portions of the rear frame assembly cut along line 7-7 of FIG. 6. FIG. 8 is a cross-sectional view of the frame and suspension assembly of FIG. 7 taken along line 8-8. FIG. 9 is a perspective view of an enlarged portion of the frame and suspension assembly of FIG. 7.

The frame and suspension assembly can include at least a portion of the rear frame assembly 36 and at least a portion of the rear suspension and wheel assembly. For example, the frame and suspension assembly can include the pair of first rear frame members 202L,202R, the final drive structure 216 and the stabilizer bar 262 such that the stabilizer bar 262 is mounted to each of the first front frame members 202L, 202R and extends in the traverse direction T of the vehicle 10 over the top of the final drive structure 216. This arrangement of the frame and suspension assembly can provide an advantageous mounting location of the stabilizer bar 262.

By positioning the stabilizer bar 262 over the top of the final drive structure 216, the stabilizer bar 262 can be located above the first portions 220L, 220R of the first rear frame members 202L, 202R, and can be located above the suspension members 228L, 228R, 2230L, 230R, 232L, 232R, 234L, 234R in the vertical direction V of the vehicle 10. Thus, the stabilizer bar 262, which can span the rear frame assembly 36 in the transverse direction T of the vehicle 10, can be easily maneuvered into position for initial assembly onto the vehicle and can be easily accessed for subsequent disassembly for repair and/or replacement.

The stabilizer bar 262 can be mounted to the vehicle from an overhead position using a method for mounting the stabilizer bar 262 for an off-road vehicle that includes connecting the stabilizer bar 262 via a linkage to the first rear suspension members 228L, 228R and via bearings 272 to a first portion 220L, 220R of the first rear frame members 202L, 202R. The stabilizer bar 262 can be mounted to frame brackets and passes laterally across the vehicle just above the final drive 216. This location for the stabilizer bar 262 can provide better stability by taking the load generated by the final drive 216. In particular, the method and apparatus of the disclosed subject matter includes connecting the stabilizer bar 262 to frame members that also support (or are directly connected to) the final drive 216 such that torque generated at the final drive 216 can be transmitted to the stabilizer bar 262, which aids in disbursing this torque away from the final drive 216 and more evenly throughout the vehicle frame.

Further, positioning the stabilizer bar 262 over the top of the final drive structure 216 can permit the stabilizer bar to be spaced away from each of the first rear suspension members 228L, 228R so that a torque input can be applied to the stabilizer bar 262 when the first rear suspension members 228L, 228R pivot relative to the main frame assembly 30.

The stabilizer bar 262 can include a base portion 264 and a pair of arms 266. Each of the arms 266 can pivot through a volume as the respective one of the first rear frame members 228L, 228R pivots relative to the main frame 30. By positioning the stabilizer bar 262 over the top of the final drive structure 216, the arms 266 can pivot in a volume that extends between each of the spring and damper assemblies 268 and the rear end of the vehicle 10 and that extends upwardly outside of the bed frame assembly 196L, 196R, 198, 200. Thus, the arms 266 of the stabilizer bar 262 can pivot without interference by other structures of the vehicle 10. Further, the arms 266 can pivot within this volume without transferring to other structures of the vehicle 10 that are adjacent to the stabilizer bar 262 the relatively high loads and/or kinetic energy input by the wheels 16L, 16R caused by uneven terrain.

Further still, the stabilizer bar 262 can be positioned above the final drive structure 216 such that the stabilizer bar 262 does not obstruct access to the threaded fasteners 261 that connect the final drive structure 216 to the upper mounting bracket 258. Thus, positioning the stabilizer bar 262 to extend over the top of the final drive assembly 216 can provide ease of installation and removal of the final drive structure 216 to/from the rear frame assembly 36.

Since the stabilizer bar 262 is mounted above the first rear suspension members 228L, 228R, a pair of connecting links 280L, 280R can connect a respective one of the arms 266 of the stabilizer bar 262 to a respective one of the first rear suspension members 228L, 228R. Each of the connecting links 280L, 280R can be pivotally connected to a respective one of the arms 266 and to a respective one of the first rear suspension members 228L, 228R in any appropriate manner such as but not limited to ball joints, threaded fasteners, rubber bushings, or any combination thereof. However, the disclosed subject includes a direct connection between the arms 266 and a respective one of the first rear suspension members 228L, 228R, and includes a plurality of links that can connect each of the arms 266 to a respective one the first rear suspension members 228L, 228R.

Referring to FIGS. 7 and 9, the frame and suspension assembly can further include a pair of stabilizer mounting brackets 270L, 270R. The stabilizer mounting brackets 270L, 270R can be a mirror image of each other. Each of the stabilizer mounting brackets 270L, 270R can be connected to a respective one of the first rear frame members 202L, 202R and a respective one of the second rear frame members 204L, 204R. For example, each of the stabilizer mounting brackets 270L, 270R can be connected to a respective one of the first rear frame members 202L, 202R and a respective one of the second rear frame members 204L, 204R at a location that is spaced above the first portions 220L, 220R of the first rear frame members 202L, 202R. Each of the stabilizer mounting brackets 270L, 270R can be connected to the respective one of the first rear frame members 202L, 202R and the respective one of the second rear frame members 204L, 204R in any appropriate manner such as but not limited to welds, adhesives, mechanical fasteners, or any combination thereof.

The stabilizer bar 262 can be mounted on each of the stabilizer mounting brackets 270L, 270R in any appropriate manner such that the base portion 264 of the stabilizer bar 262 can rotate relative to each of the stabilizer mounting brackets 270L, 270R. For example, a pair of bearings 272 can be mounted on the base portion 264 such that the base portion is free to rotate within each of the bearings 272. Each of the bearings 272 can be mounted to a respective one of the stabilizer mounting brackets 270L, 270R. The bearings 272 can be configured as journal bearings or as rolling element bearings.

The specific location of the stabilizer bar 262 relative to the final drive 216 can be characterized in that the stabilizer bar 262 is located vertically above the final drive 216 such that a vertical axis that passes through a center of the stabilizer bar 262 (along a central axis of the stabilizer bar 262) intersects the final drive 216. The FIG. 7 top view shows this physical relationship between the stabilizer bar 262 and final drive 216. The vertical, transverse, and longitudinal axes of the stabilizer bar 262 and final drive 216 all being positioned relative to the vehicle 10 as shown in FIG. 2.

The first rear frame members 202L, 202R can be described as being sandwiched between and directly connected to each of the final drive 216 and stabilizer bar 262. Thus, the frame members that support the final drive 216 are also directly connected to the stabilizer bar 262, which allows torque to be transferred from the final drive 216 to the stabilizer bar 262.

Referring to FIG. 4, the vehicle can include a muffler 274 and an exhaust assembly 276. The muffler 274 and the exhaust assembly 276 can be mounted on the rear frame assembly 36 adjacent to the stabilizer bar 262. Referring FIGS. 4, and 6-8, a heat shield 278 can be mounted on each of the bearings 272. The heat shields 278 are omitted from FIG. 9 to more clearly show the bearings 272.

The frame and suspension assembly can further include at least a portion of the main frame assembly 30 and the first rear suspension members 228L, 228R configured as described above with respect to the exemplary embodiment of FIGS. 7-9. The frame and suspension assembly can further include the rear lower frame member 190 configured as described above with respect to the exemplary embodiment of FIGS. 1-9.

VI. Attachment of the Stabilizer Bar

Figure 10:
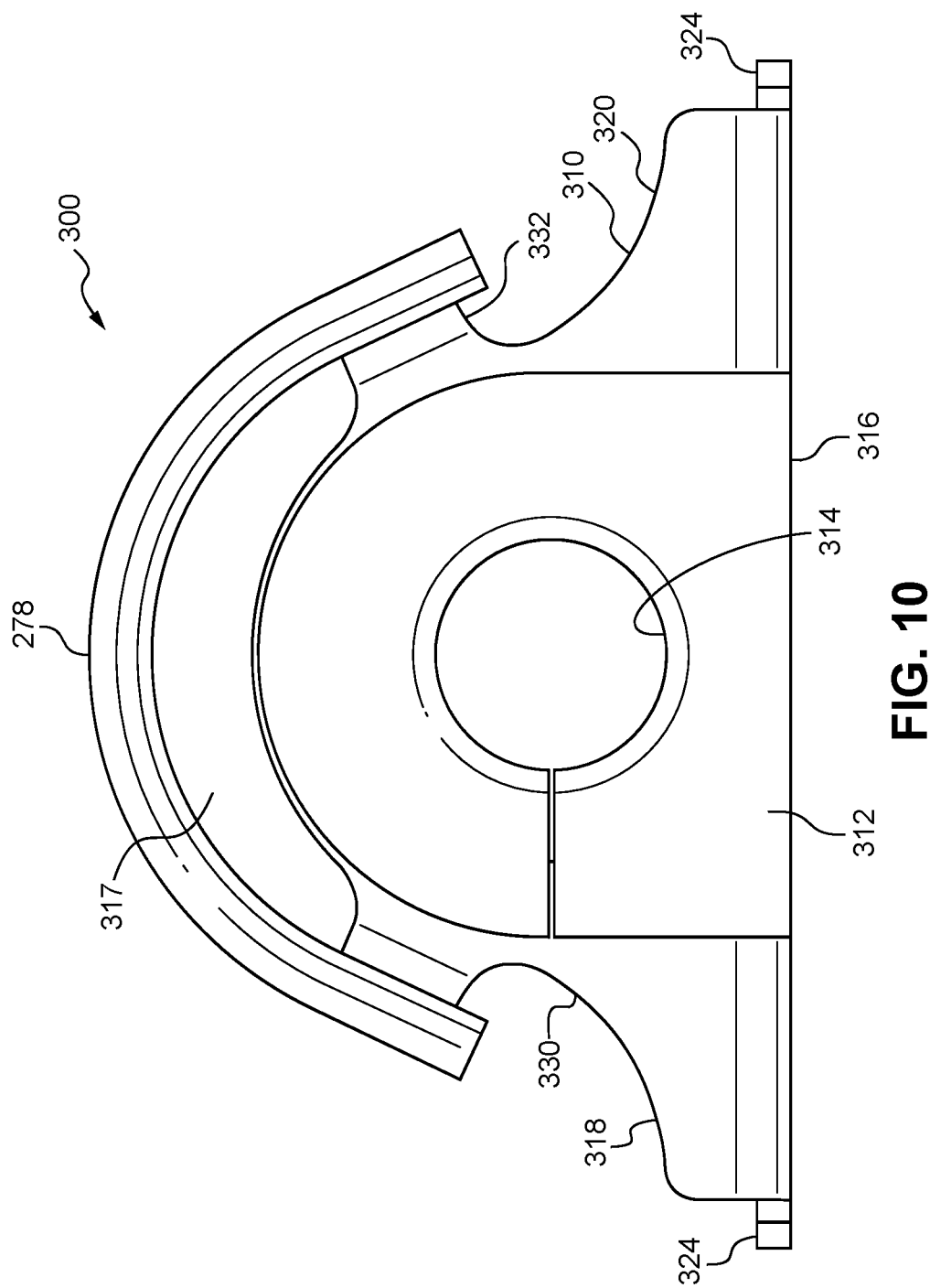
FIG. 10 is an end view of a connecting apparatus for attaching a stabilizer bar to a vehicle.

Referring now to FIGS. 10-14, additional details of an apparatus for connecting the stabilizer bar 262 to the vehicle 10 are described. FIG. 10 depicts an end view of the connecting apparatus, indicated generally at 300. The connecting apparatus 300 includes the bearing 272 and the heat shield 278 discussed above. More specifically, the bearing 272 includes a support 310 and a bushing 312. The bushing 312 includes a through hole 314 for receiving the stabilizer bar 262 therethrough to support the stabilizer bar 262 while allowing the stabilizer bar 262 to rotate within the bushing 312. The bushing 312 may also include an end wall 316 on one or both ends of the bushing 312 for abutting against the support 310 to facilitate holding the bushing 312 in place with respect to the support 310. In one embodiment, the bushing 312 may be formed of an elastomeric or rubber material that is configured deform and to absorb vibrations applied through the stabilizer bar 262.

Due to the type of materials used to construct the bushing 312, excessive heat from the muffler 274 or engine may damage the bushing 312. Accordingly, the heat shield 278 may be joined to the support 310 at a position that is spaced apart from the bushing 312 to define a gap 317 between the heat shield 278 and the bushing 312. The gap 317 may be configured to allow air to pass between the heat shield 278 and the bushing 312 to reduce heat transfer from the muffler 274 to the bushing 312. The heat shield 278 may therefore be configured to shield and protect the bushing 312 from heat emitted from the muffler 274 or engine.

Figure 11:
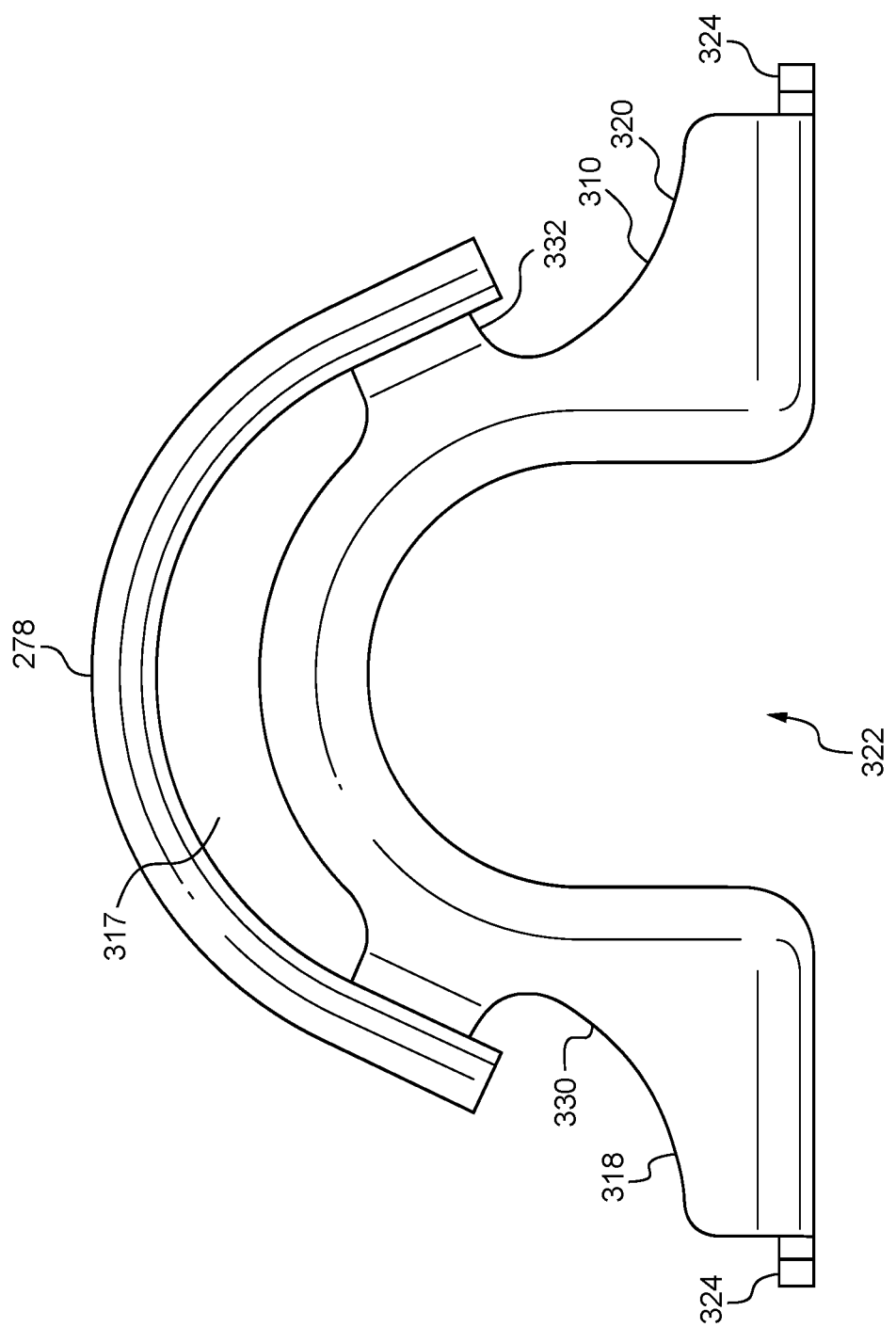
FIG. 11 is an end view of the connecting apparatus of FIG. 10 with a bushing removed.
Figure 12:
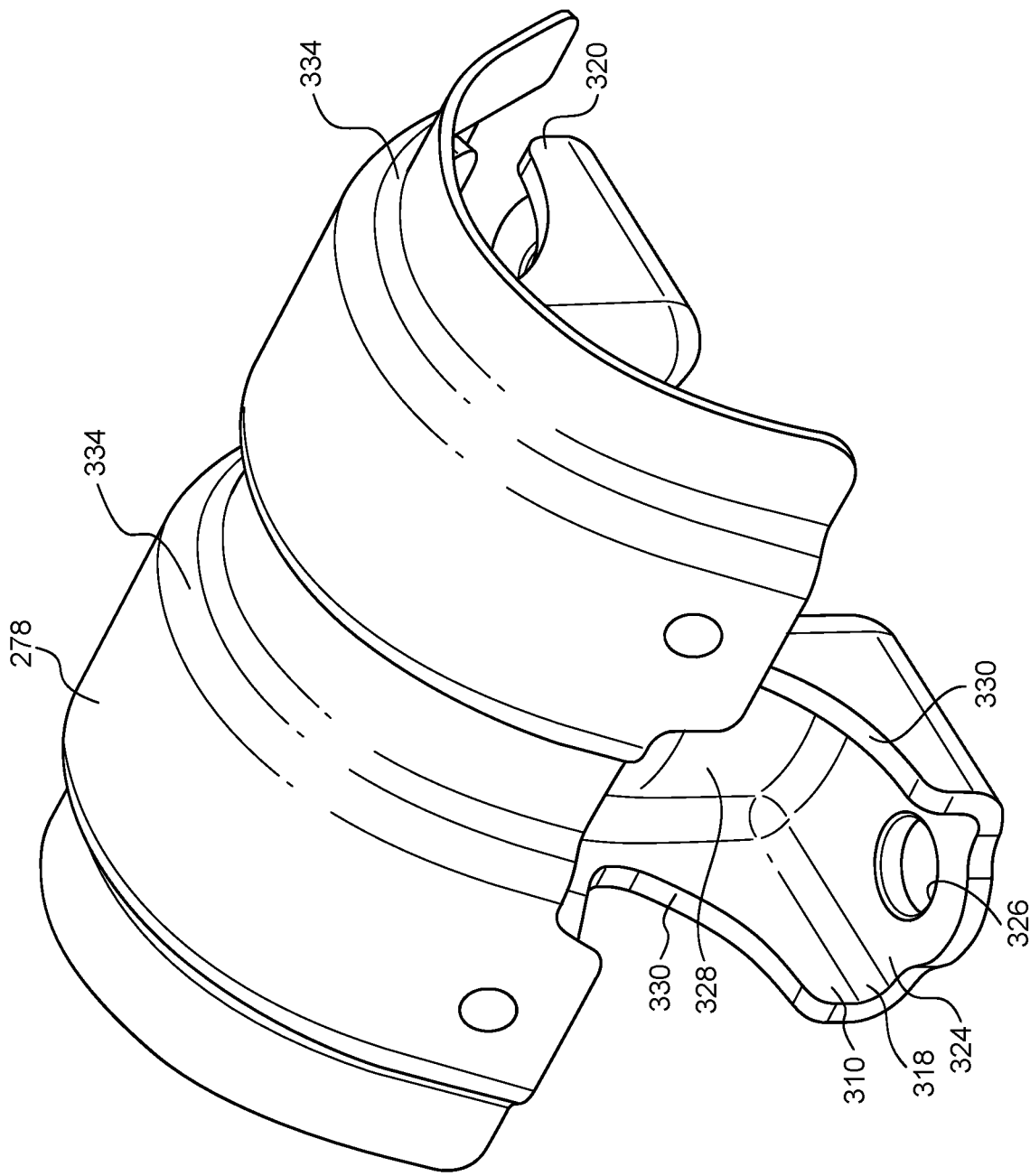
FIG. 12 is an upper perspective view of the connecting apparatus of FIG. 11.
Figure 13:
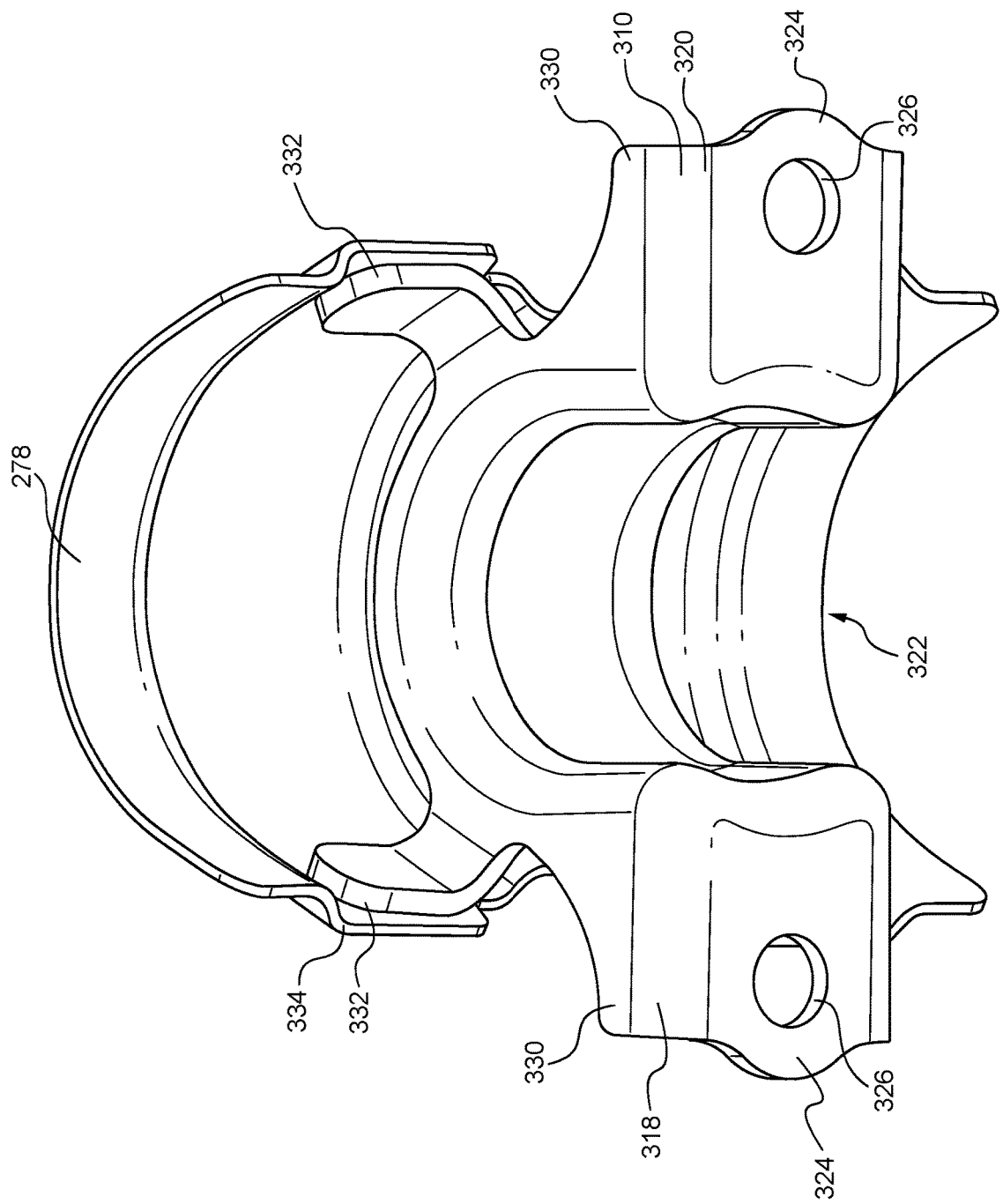
FIG. 13 is a lower perspective view of the connecting apparatus of FIG. 11.

Referring to FIG. 11, an end view is shown of the support 310 and the heat shield 278 with the bushing 312 removed. FIG. 12 depicts an upper perspective view of the support 310 and the heat shield 278. FIG. 13 depicts a lower perspective view of the support 310 and the heat shield 278. Also, FIG. 14 depicts an upper perspective view of the support 310 with both the bushing 312 and the heat shield 278 removed.

Referring to FIGS. 10-14, the support 310 includes a first portion 318 for being attached to the vehicle 10 on one side of the stabilizer bar 262, and a second portion 320 for attaching to the vehicle 10 on an opposite side of the stabilizer bar 262. The support 310 extends in a first direction between the first portion 318 and the second portion 320 and defines a space 322 for receiving the bushing 312 for receiving the stabilizer bar 262 such that the stabilizer bar 262 extends in a second direction substantially perpendicular to the first direction.

The first portion 318 and the second portion 320 may each include a base 324 having a fastener opening 326 for receiving a fastener such as a bolt, screw, rivet, or the like, for fastening the apparatus 300 to the vehicle 10. Specifically, the apparatus 300 may be attached to the stabilizer mounting brackets 270L, 270R, as shown most clearly in FIGS. 8 and 9.

Figure 14:
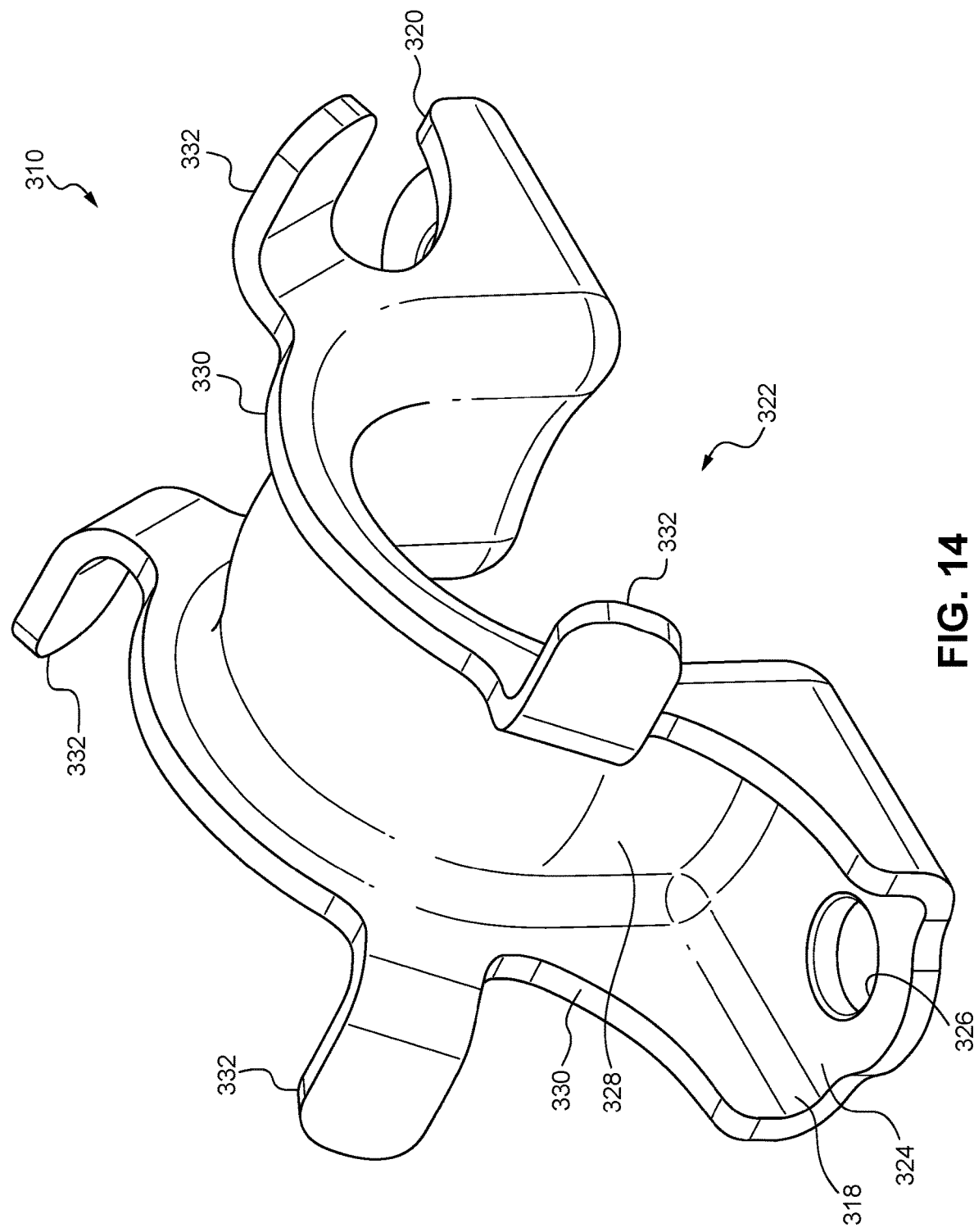
FIG. 14 is an upper perspective view of the connecting apparatus of FIG. 10 with the bushing and heat shield removed.

As shown most clearly in FIG. 14, the support 310 may include a body portion 328 formed of the first portion 318 and the second portion 320 and defining the space 322 for receiving the bushing 312. The support 310 may include side walls 330 extending substantially perpendicular to the body portion 328 to form a substantially "U" or channel shaped cross section. One or more tabs 332 may extend from the side walls 330 to provide an area for welding the heat shield 278 to the support 310. In the embodiment shown, four tabs 332 are provided on the side walls 330 in opposing pairs, two on the first portion 318 and two on the second portion 320 of the support 310. The tabs 332 may be configured to extend in a direction substantially perpendicular to the side walls 330, and substantially parallel to the adjacent body portion 328 of the support 310. In one embodiment, the heat shield 278 may be joined to the tabs 332 by welding, fasteners, adhesives, or the like, so that the heat shield 278 and the support 310 form a one-piece unit prior to assembling with the bushing 312 and the stabilizer bar 262 on the vehicle 10.

The heat shield 278 may form a partial tubular member and may be attached to the tabs 332 to extend in a direction (referred to previously as the "second direction") along the length of the bushing 312 and the stabilizer bar 262. The heat shield 278 may extend in the second direction beyond the support 310 and the bushing 312 an adequate amount so as to provide desired protection to the bushing 312. The embodiment of the heat shield 278 disclosed includes corrugations 334 transverse to the length of the heat shield 278. The corrugations 334 may be configured to receive the tabs 332 to facilitate aligning the heat shield 278 on the support 310 during assembly of the apparatus 300, as shown most clearly in FIG. 13. Moreover, the corrugations 334 may increase the strength of the heat shield 278. However, it will be understood that the heat shield 278 may be formed in other shapes, including smooth semi-cylindrical shapes, polygonal shapes, and the like.

It will be understood that the present disclosure provides a connecting apparatus 300 that is easy to manufacture and install. The heat shield 278 can be attached to the support 310 prior to assembling to the stabilizer bar 262 so that the heat shield 278 and the support 310 can be combined as a single part for simplified attachment to the vehicle. Moreover, the present disclosure provides a connecting apparatus 300 that simplifies and improves the protection of the bushing 312 from heat emitted from the vehicle engine or exhaust system. The apparatus 300 allows the bushing 312 to be protected from heat while allowing the bushing 312 to be located at its optimal location for performance since additional attaching mechanisms are not needed to attach the heat shield 278 to the vehicle 10.

VII. Alternative Embodiments

While certain embodiments of the invention are described above, and FIGS. 1-14 disclose a best mode for practicing the various inventive aspects, it should be understood that the invention can be embodied and configured in many different ways without departing from the spirit and scope of the disclosure.

For example, embodiments are disclosed above in the context of a vehicle 10 shown in FIG. 1. However, embodiments are intended to include or otherwise cover any type of vehicle disclosed above. For example, exemplary embodiments are intended to include or otherwise cover any type of vehicle that can travel on an improved surface such as but not limited to a paved road.

Exemplary embodiments are intended to include or otherwise cover any type of rear frame assembly 36. In other words, exemplary embodiments are intended to cover any application of rear frame assembly that can sustain load or kinetic energy inputs from a rear suspension and wheel assembly. For example, the first rear frame members 202L, 202R can be made from a plurality of parts or made as a unitary homogenous component. Further, instead of using tubes, the one or more of the rear frame members can be formed into beam structures in manner that is similar to the rear connecting frame members 210L, 210R.

Exemplary embodiments are intended to include any appropriate shape for each of the front or rear frame members, including different cross-sectional shapes, hollow or solid shapes, etc.

Exemplary embodiments are intended to include or otherwise cover the first rear frame members or the third rear frame members connected to any appropriate portion of the main frame assembly.

Exemplary embodiments are intended to include or otherwise cover any type of rear suspension and wheel assembly. For example, embodiments are disclosed in the context of a first rear suspension member that has a unique geometry compared to each of the second, third and fourth rear suspension members, and a fourth suspension member that has a unique geometry as compared to each of the second and third suspension members. Exemplary embodiments are intended to include other types of suspension members such as but not limited to an upper suspension member and a lower suspension member that are configured as A-arms (also referred to as wishbones). Exemplary embodiments are also intended to include an upper suspension member that has the same geometry compared to the lower suspension member.

Embodiments are disclosed above in the context of vehicle 10 shown in FIG. 1 having a front frame assembly that includes a front bumper assembly. However, embodiments are intended to include or otherwise cover vehicles that include a rear bumper assembly connected to the rear end of the rear frame assembly.

Although the drawings depict a stabilizer bar 262 located over the final drive 216 located in the rear frame of the vehicle 10, the disclosed subject matter contemplates use of the stabilizer bar 262 located over a final drive 216 located in the front frame assembly 32 of the vehicle, either in addition to or alternate to the stabilizer bar 262 located in the rear frame assembly 36 of the vehicle.

While the subject matter has been described in detail with reference to exemplary embodiments thereof, it will be apparent to one skilled in the art that various changes can be made, and equivalents employed, without departing from the scope of the disclosure.

What is claimed is:

1. An apparatus for connecting a stabilizer bar to a vehicle, the apparatus comprising:
    a support defining a body portion having a first portion for attaching to the vehicle on one side of the stabilizer bar, and a second portion for attaching to the vehicle on an opposite side of the stabilizer bar, the support extending in a first direction between the first portion and the second portion and defining a space on an interior side of the body portion for receiving a bushing for the stabilizer bar such that the stabilizer bar is configured to extend in a second direction substantially perpendicular to the first direction; and
    a heat shield joined to the support on an exterior side of the body portion, and configured for shielding the bushing from heat, the heat shield extending beyond the support in the second direction and spaced apart from the body portion to define a gap between the heat shield and the exterior side of the body portion.

2. The apparatus of claim 1, wherein each of the first portion and the second portion of the support comprises a base having a fastener opening for receiving a fastener to attach the support to the vehicle.

3. The apparatus of claim 1, wherein the support comprises side walls extending substantially perpendicular to the body portion.

4. The apparatus of claim 3, further comprising at least one tab extending from one of the side walls.

5. The apparatus of claim 1, wherein the heat shield comprises a corrugation configured to receive the at least one tab on the support to facilitate positioning the heat shield on the support.

6. The apparatus of claim 1, wherein the heat shield defines a partial tubular member.

7. The apparatus of claim 1, wherein the support comprises a pair of side walls, and further comprising a plurality of tabs extending from the side walls, wherein the heat shield is attached to the plurality of tabs.

8. The apparatus of claim 1, wherein each of the first portion and the second portion of the support comprises a base having a fastener opening for receiving a fastener to attach the support to the vehicle;
    wherein the support comprises a pair of side walls extending substantially perpendicular to the body portion;
    wherein the support further comprises a pair of tabs extending from each of the side walls such that two tabs extend from the first portion of the support and two tabs extend from the second portion of the support, the tabs extending in a direction substantially perpendicular to the side walls;
    wherein the heat shield is welded to the tabs;
    wherein the heat shield defines a partial tubular member; and
    wherein the heat shield comprises a plurality of corrugations configured to receive the tabs on the support to facilitate positioning the heat shield on the support.

9. An apparatus for connecting a stabilizer bar to a vehicle, the apparatus comprising:
    a support defining a body portion having a first portion for attaching to the vehicle on one side of the stabilizer bar, and a second portion for attaching to the vehicle on an opposite side of the stabilizer bar, the support defining a space for receiving a bushing for the stabilizer bar on an interior side of the body portion between the first portion and the second portion, the support further comprising at least one tab extending on an exterior side of the body portion; and
    a heat shield joined to the at least one tab of the support on the exterior side of the body portion such that the body portion is configured to be positioned between the bushing and the heat shield, the heat shield configured for shielding the bushing from heat.

10. The apparatus of claim 9, wherein the support comprises and a pair of side walls extending from the body portion.

11. The apparatus of claim 10, wherein the at least one tab comprises a plurality of tabs, and wherein the plurality of tabs extend from the pair of side walls.

12. The apparatus of claim 11, wherein the plurality of tabs extend in a direction substantially perpendicular to the side walls.

13. The apparatus of claim 9, wherein each of the first portion and the second portion of the support comprises a base having a fastener opening for receiving a fastener to attach the support to the vehicle.

14. The apparatus of claim 9, wherein the heat shield is spaced apart from the body portion to define a gap between the heat shield and the exterior side of the body portion.

15. The apparatus of claim 9, wherein the heat shield comprises a corrugation configured to receive the at least one tab on the support to facilitate positioning the heat shield on the support.

16. An apparatus for connecting a stabilizer bar to a vehicle, the apparatus comprising:
- a support configured for being attached to the vehicle;
- a bushing disposed in the support, the bushing having a through hole for receiving the stabilizer bar therethrough; and
- a heat shield joined to the support and spaced apart from the bushing to define a gap between the heat shield and the bushing, the heat shield configured for shielding the bushing from heat;
- wherein the support comprises a body portion and a pair of side walls extending from the body portion, wherein a plurality of tabs extend from the side walls, and wherein the heat shield is attached to the plurality of tabs.

17. The apparatus of claim 16, wherein the bushing has an end wall that abuts against the support.

18. The apparatus of claim 16, wherein the support has a first portion for attaching to the vehicle on one side of the stabilizer bar, and a second portion for attaching to the vehicle on an opposite side of the stabilizer bar, the support extending in a first direction between the first portion and the second portion and defining a space for receiving the bushing for the stabilizer bar such that the stabilizer bar is configured to extend in a second direction substantially perpendicular to the first direction.

19. The apparatus of claim 18, wherein the heat shield extends beyond the bushing in the second direction.

20. The apparatus of claim 16, wherein the heat shield comprises a plurality of corrugations configured to receive the plurality of tabs on the support to facilitate positioning the heat shield on the support.

* * * * *